United States Patent
Gallazzini

(10) Patent No.: US 9,731,759 B2
(45) Date of Patent: Aug. 15, 2017

(54) TRACTOR HAVING DUAL HYDROSTATIC DRIVE WITH SINGLE HAND CONTROL AND ATTACHMENT ADAPTER FOR POWERED ATTACHMENTS

(71) Applicant: Silvio Gallazzini, Berkeley Heights, NJ (US)

(72) Inventor: Silvio Gallazzini, Berkeley Heights, NJ (US)

( * ) Notice: Subject to any disclaimer, the term of this patent is extended or adjusted under 35 U.S.C. 154(b) by 0 days.

(21) Appl. No.: 14/616,908

(22) Filed: Feb. 9, 2015

(65) Prior Publication Data

US 2015/0151788 A1    Jun. 4, 2015

Related U.S. Application Data

(62) Division of application No. 13/345,366, filed on Jan. 6, 2012, now Pat. No. 8,978,796.

(51) Int. Cl.
| | | |
|---|---|---|
| *B60K 31/00* | (2006.01) | |
| *B62D 11/00* | (2006.01) | |
| *B60K 17/28* | (2006.01) | |
| *B62D 51/06* | (2006.01) | |
| *B62D 11/04* | (2006.01) | |
| *B62D 11/12* | (2006.01) | |
| *F16H 61/437* | (2010.01) | |

(52) U.S. Cl.
CPC ............ *B62D 11/006* (2013.01); *B60K 17/28* (2013.01); *B62D 11/04* (2013.01); *B62D 11/12* (2013.01); *B62D 51/06* (2013.01); *B60K 31/00* (2013.01); *B60Y 2200/225* (2013.01); *F16H 61/437* (2013.01)

(58) Field of Classification Search
CPC ....... B62D 11/006; B62D 11/12; B62D 11/04; B62D 51/06; B62D 51/001; B62D 1/00; B62D 1/02; B62D 1/12; B60K 17/30; B60K 17/303; B60K 17/306; B60K 17/358; B60K 17/28; A01D 34/68; A01D 34/67; A01D 34/69; A01D 2034/6843
USPC .... 180/170, 6.2, 333, 19.1, 19.2, 19.3, 6.32, 180/6.48, 215, 218, 53.1, 53.6, 53.61, 180/53.62, 53.7, 53.8; 172/40, 42, 439; 56/2, 11.9, 12.6, 15.6
See application file for complete search history.

(56) References Cited

U.S. PATENT DOCUMENTS

| | | |
|---|---|---|
| 2,538,708 A | 1/1951 | Rose |
| 2,695,071 A | 11/1954 | Hupp |

(Continued)

OTHER PUBLICATIONS

Rapid Tractor, brochure, approx. 2010.

(Continued)

*Primary Examiner* — James M Dolak
(74) *Attorney, Agent, or Firm* — Ostrolenk Faber LLP

(57) ABSTRACT

A tractor has a base for supporting a motive power source, left and right driven wheels, and left and right transmissions for the respective left and right wheels. A handle structure is coupled to the base for grasping by an operator from behind the tractor. A drive system drives each of the left and right transmissions with motive power from the motive power source. A single lever hand control is provided for operation by a single hand of the operator for controlling both left and right transmissions seamlessly each between reverse speed through neutral and forward speed.

38 Claims, 19 Drawing Sheets

(56) References Cited

U.S. PATENT DOCUMENTS

| | | | |
|---|---|---|---|
| 3,661,212 A * | 5/1972 | Johnson | A01B 3/50 172/258 |
| 3,710,904 A * | 1/1973 | Boyer | F16H 61/22 180/336 |
| 3,882,615 A | 5/1975 | Williams | |
| 3,938,400 A * | 2/1976 | Konyha | 474/5 |
| 4,541,497 A * | 9/1985 | Riediger | B62D 11/183 180/333 |
| 4,597,203 A | 7/1986 | Middleton | |
| 4,920,733 A | 5/1990 | Berrios | |
| 4,920,734 A | 5/1990 | Wenzel | |
| 4,938,302 A * | 7/1990 | Schott | B60K 17/28 180/315 |
| 5,077,959 A | 1/1992 | Wenzel | |
| 5,127,215 A | 7/1992 | Wenzel | |
| 5,279,376 A | 1/1994 | Yang | |
| 5,441,116 A | 8/1995 | Rodriguez | |
| 5,488,818 A * | 2/1996 | Powers et al. | 56/11.4 |
| 5,518,079 A * | 5/1996 | Zvolanek | 180/19.1 |
| 5,644,903 A | 7/1997 | Davis, Jr. | |
| 5,822,961 A * | 10/1998 | Busboom | 56/11.4 |
| 5,894,714 A * | 4/1999 | Braun et al. | 56/11.4 |
| 5,896,931 A | 4/1999 | Roberts et al. | |
| 5,913,802 A * | 6/1999 | Mullet | A01D 34/6806 180/19.3 |
| 6,095,944 A * | 8/2000 | Buchanan | B60T 11/103 192/220.1 |
| 6,155,033 A * | 12/2000 | Wians et al. | 56/11.1 |
| 6,341,479 B1 | 1/2002 | Scag et al. | |
| 6,557,331 B2 * | 5/2003 | Busboom et al. | 56/10.8 |
| 6,622,464 B2 * | 9/2003 | Goman et al. | 56/16.9 |
| 6,643,959 B2 | 11/2003 | Jolliff et al. | |
| 6,935,446 B2 | 8/2005 | Walker | |
| 6,941,735 B1 | 9/2005 | Tamas | |
| 6,941,739 B1 | 9/2005 | Gliser | |
| 7,146,787 B2 | 12/2006 | Walker | |
| 7,467,677 B2 * | 12/2008 | Barrier | 180/6.48 |
| 7,478,689 B1 * | 1/2009 | Sugden et al. | 180/19.3 |
| 7,740,091 B2 * | 6/2010 | Bartel | 180/6.48 |
| 7,762,739 B2 | 7/2010 | Blanchard | |
| 7,984,573 B2 | 7/2011 | Lau | |
| 8,113,306 B2 * | 2/2012 | Mass et al. | 180/19.1 |
| 8,240,420 B1 * | 8/2012 | Bartel | A01D 34/64 180/315 |
| 8,833,482 B2 | 9/2014 | Valet et al. | |
| 9,409,596 B2 * | 8/2016 | Hauser | B62D 7/08 |
| 9,499,199 B1 * | 11/2016 | Laymon | B60K 6/46 |
| 9,567,019 B2 * | 2/2017 | Keller | B62D 51/06 |
| 2004/0007402 A1 | 1/2004 | Kujawa | |

OTHER PUBLICATIONS

Lipco, pp. 33 and 34, 2005-2006 Catalog.
Ferris, brochure, pp. 26-29, Feb. 2011.
DRpower, Field and Brush Mowers, brochure, pp. 45 and 46, 2009.
Walker Mowers, brochure, 2011 (Internet).
Turf Teq, Discover the Cutting Edge to Productivity and Profitability, brochure, pp. 1-8, 2011 (Internet).
Rapid Technic AG, brochure, pp. 1-8, Apr. 2005.
Gravely Rapid, 2007 Product Lineup, brochure, Dec. 2006.
Rapid Technic AG, Spare parts list, brochure, Sep. 2005.
BCS, Power Units and Gardening Attachments, Owners Use and Care Manual, Jan. 1995.
Gravely, Professional 2-Wheel Tractor Operator's Manual, Jun. 1992.
Gravely, Commercial 8 Owners Manual, Feb. 1970.
Gravely Rapid, 2006 Product Lineup, brochure, Sep. 2006.
Graveley, 2010 Product Catalog.
Ferris, HydroDrive, 2009 Briggs & Stratton Power Products Group, LLC, Part# 0901HDS.
Transmission (mechanics)—Wikipedia encyclopedia, http://en.wikipedia.org/wiki/Transmission_(mechanics), Feb. 17, 2011.
Walker Rider Lawnmowers, Owner's Manual and Illustrated Parts Manual, Nov. 1, 2003, pp. 1-49.

* cited by examiner

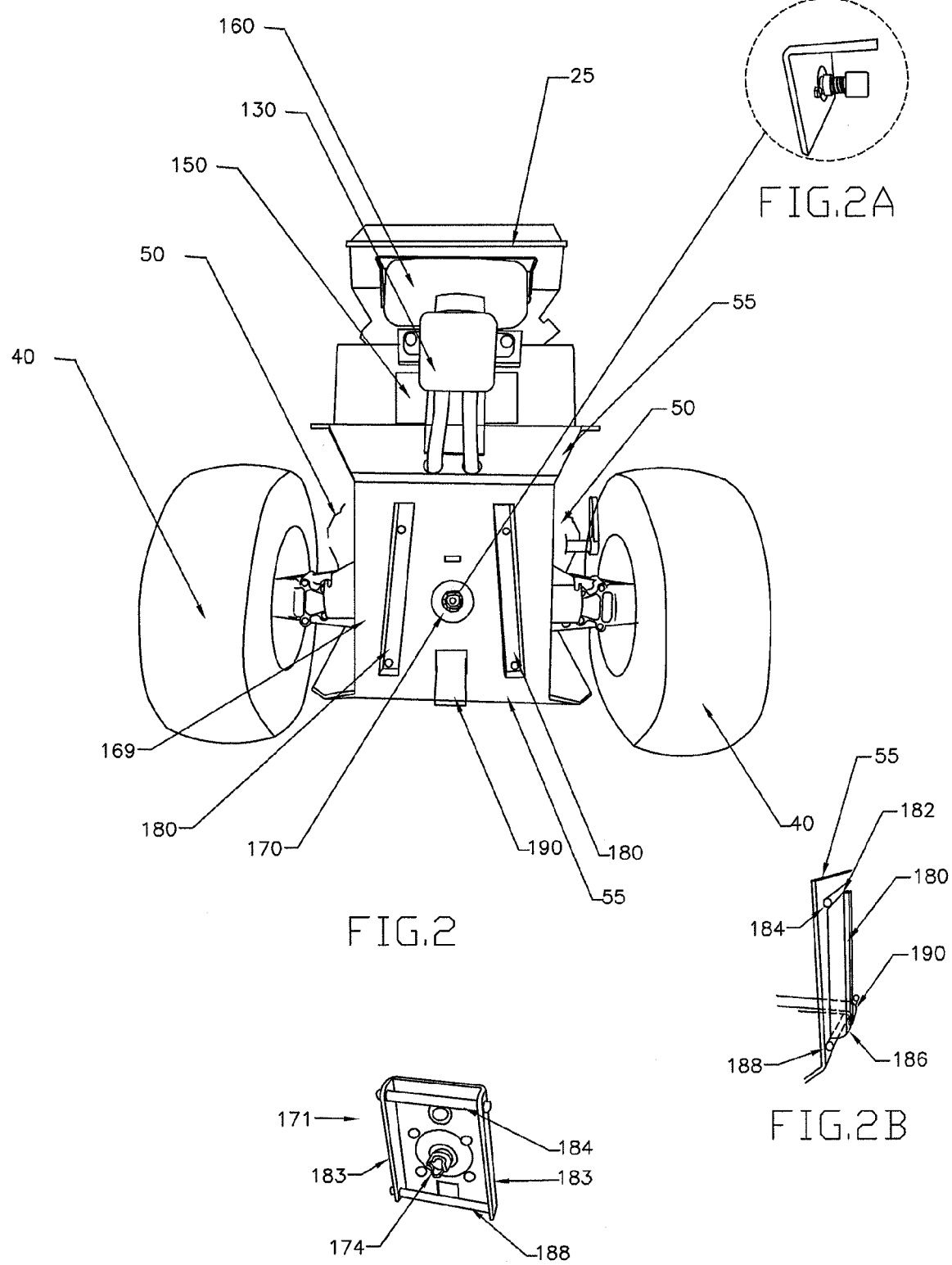

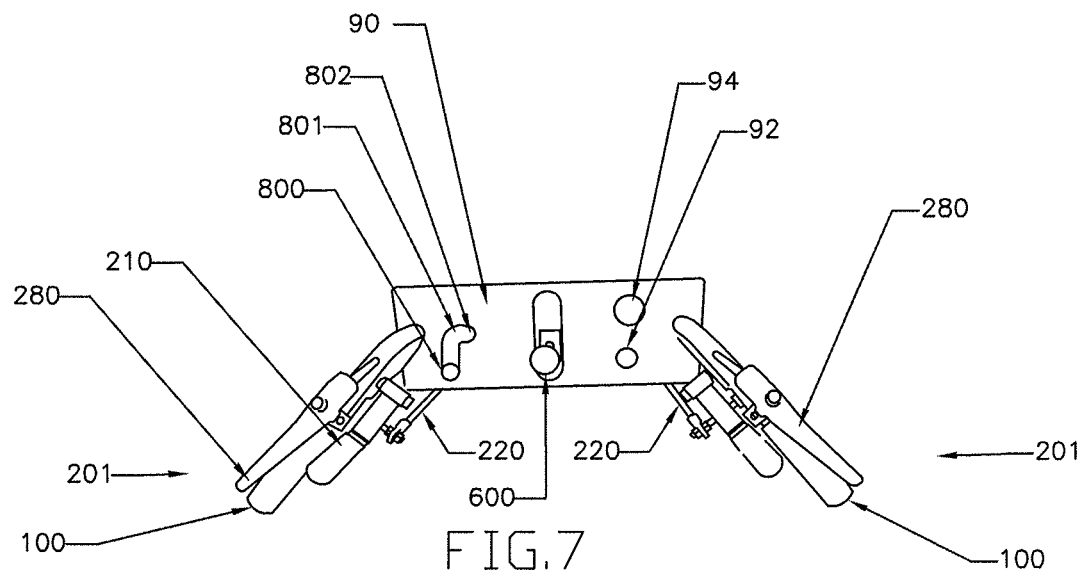
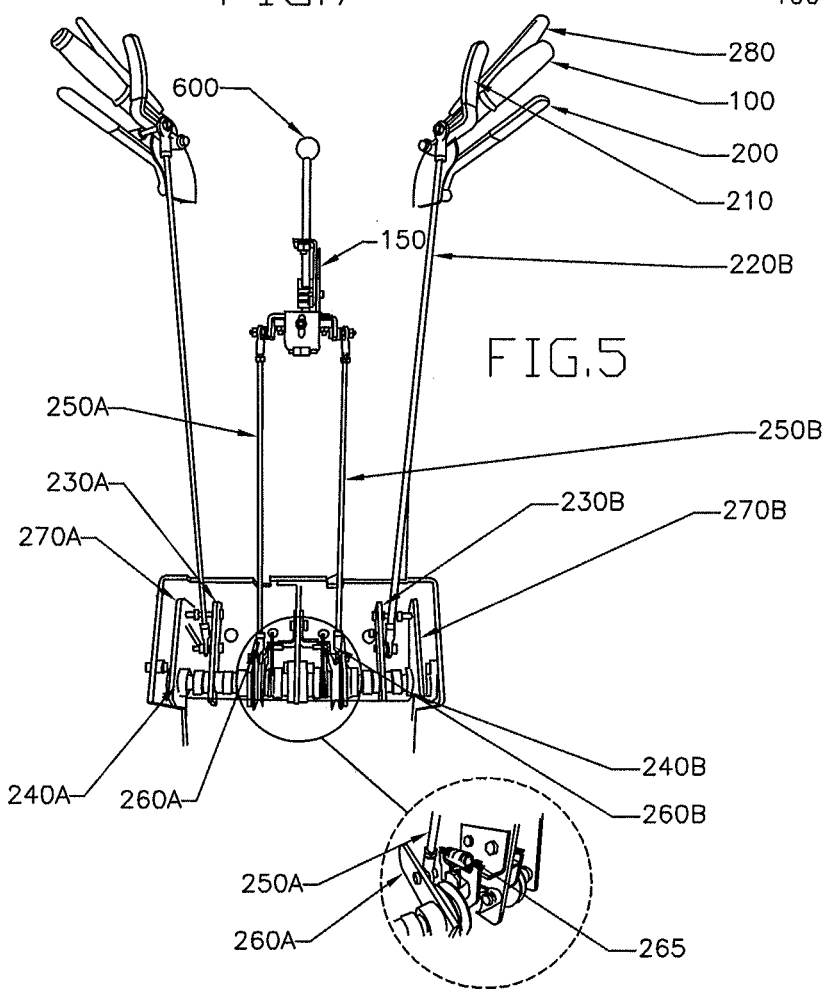

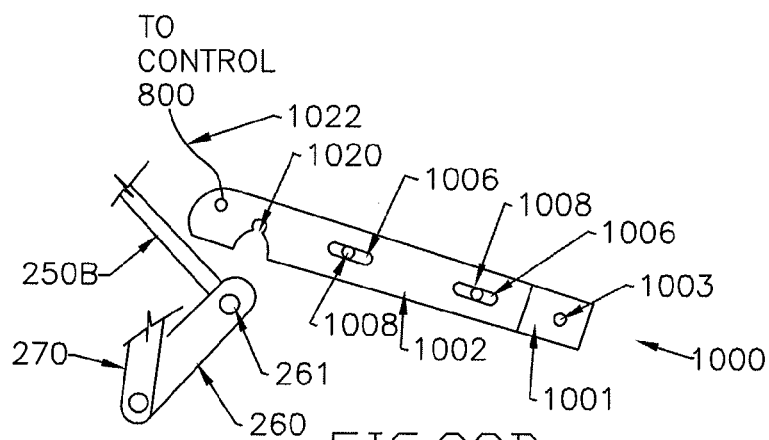
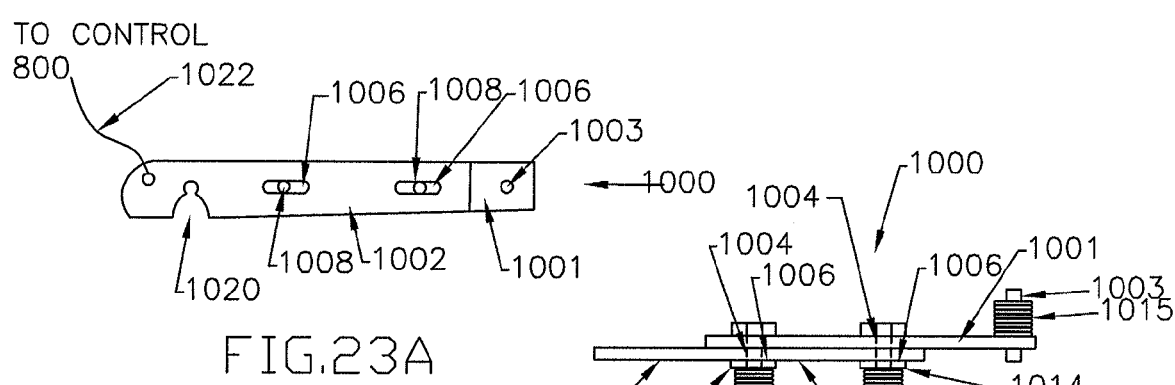
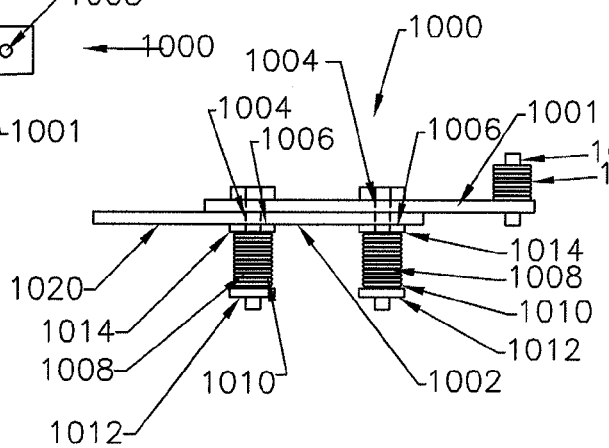

TRACTOR HAVING DUAL HYDROSTATIC DRIVE WITH SINGLE HAND CONTROL AND ATTACHMENT ADAPTER FOR POWERED ATTACHMENTS

CROSS REFERENCE TO RELATED APPLICATIONS

This is a divisional of commonly-assigned U.S. patent application Ser. No. 13/345,366, filed Jan. 6, 2012, entitled TRACTOR HAVING DUAL HYDROSTATIC DRIVE WITH SINGLE HAND CONTROL AND ATTACHMENT ADAPTER FOR POWERED ATTACHMENTS, the entire disclosures of which are hereby incorporated by reference.

BACKGROUND OF THE INVENTION

Field of the Invention

This invention pertains to tractors generally, and in particular, to walk-behind hand tractors also known as mono-axle or two wheel tractors.

Description of the Background

Walk-behind hand tractors, including hand tractors with multiple attachments for performing various grounds maintenance chores have been commercially available in the marketplace for a long time. An example of this can be found in E. L. Rose (U.S. Pat. No. 2,538,708). At present, hand tractors of this type employ a single transmission, either gear or hydrostatically driven, coupled through a differential to the drive wheels. In this current design, the operator makes directional changes to the tractor by applying body weight force to the handles. Still others have steering brakes that effectively brake the inside wheel causing the tractor to turn toward the braked wheel. Unfortunately, the effect of the differential drive is to transfer all the motion to the unbraked wheel thereby doubling its wheel speed and making the tractor difficult to control. The differential drive also makes the tractor unstable and hard to control on sloped terrain. As the tractor navigates across the slope, the operator must use body weight force to counter the tractor's tendency to turn downhill. This can lead to operator fatigue and a loss of traction and control of the hand tractor. A further disadvantage of this design is that motive power is biased to the wheel with the least grip. This is a particular disadvantage when the tractor is attempting to perform chores where maximum traction is necessary like mowing slopes or moving snow. A still further disadvantage is that the brake components are subject to premature wear and constant maintenance and service.

Still other tractors in the prior art utilize wheel drive with a hydrostatic pump-to-motor transmission. This configuration affords the operator the ability, through valving, to effectively slow down or stop the inside wheel to cause a turn. These hand tractors, while a substantial improvement to the differential design, have certain drawbacks as well. This design does not enable the operator of the tractor to make the wheels rotate in opposing directions to cause a zero radius turn. Furthermore, these hand tractors have proven to be complicated and expensive to build and have yielded only limited success in the marketplace.

Still other embodiments exist in the prior art such as Wenzel (U.S. Pat. No. 5,127,215) and Walker (U.S. Pat. No. 7,146,787). These machines effectively deploy independent dual drive motion control to the drive wheels enabling the operator to perform a zero radius turn. These machines have vertical crankshaft motors that utilize a belt configuration in the horizontal plane that connects directly to the lawn mower, or in the case of Walker, to a series of complicated and expensive gearboxes and drive shafts to power the mowing unit. These machines, while functional for lawn mowing, serve little purpose, if any, in utilizing other chore performing attachments.

To be complete, it must be mentioned that nowhere in the prior art does there exist, to applicant's knowledge, a hand tractor that utilizes an attachment adapting method with integral power take off (PTO), that can be deployed quickly, easily and safely, by one person without disabling the hand tractor.

The need exists in the marketplace for a reliable, simply designed, walk-behind hand tractor with independent control to each drive wheel that has the ability to be operated with one hand and that can rapidly and safely deploy attachments by a single operator without tools. To date, to applicant's knowledge, no such hand tractor has been available in the industry.

SUMMARY OF THE INVENTION

It is an object of this invention to provide a hand tractor that avoids the drawbacks associated with the prior art.

More specifically, it is an object of the current invention to provide a hand tractor with dual seamless drive that independently drives left and right wheels from reverse through neutral to maximum forward speed thus providing clutchless, dynamic control of both speed and direction to the hand tractor.

A further object of the present invention is to provide a tractor that can be controlled via a single control with one hand that controls simultaneously both left and right seamless drive units from reverse through neutral to a maximum forward speed.

A further object of the current invention is to provide a hand tractor with controls at the handles that enable the operator to control the hand tractor with independent hand controls or by deployment of a single lever omni-directional hand control that can simultaneously deploy both left and right seamless drive units from reverse through neutral to a maximum forward speed, effectively allowing the user to choose between two-handed operation or single-handed operation as desired.

An even further object of the current invention is to provide a hand tractor that provides a means for the operator to select and set a determined forward speed via a cruise control, e.g., friction device, enabled on the single lever hand control while still maintaining the operator's ability to control the speed and direction of the hand tractor with the independent hand controls.

It is an additional object of this invention to provide a feature for the independent hand controls and the single hand control to be urged toward neutral when the operator releases the hands or hand.

It is still another object of the current invention to provide a means of rapidly and safely installing and removing chore performing PTO driven front attachments without the use of tools by a single operator through a self aligning hitch with means for a positive force latching mechanism with integral PTO drive shaft alignment, coupling and engagement.

It is an additional object of the current invention to utilize a rapidly deployable front mounted attachment adapter and integral PTO that uses the biased weight of the tractor to pull the attachment into the latching mechanism so that a single operator can install attachments unaided.

It is still a further object of this invention to provide a means for attaching a rear PTO and attachment adapter that can be deployed simultaneously with the front PTO attachment adapter.

In accordance with an embodiment of the invention, a tractor is provided comprising a base for supporting a motive power source, left and right driven wheels, and left and right transmissions for the respective left and right wheels; a handle structure coupled to the base for grasping by an operator from behind the tractor; a drive system for driving each of the left and right transmissions with motive power from the motive power source; further comprising a single lever hand control for operation by a single hand of the operator for controlling both left and right transmissions seamlessly each between reverse speed through neutral and forward speed.

In accordance with another embodiment, a tractor is provided comprising a base for supporting a motive power source, left and right driven wheels and left and right transmissions for the respective left and right wheels; a handle structure coupled to the base for grasping by an operator from behind the tractor; a drive system for driving each of the left and right transmissions with motive power from the motive power source, further wherein there is a longitudinally disposed space between the left and right transmissions; further comprising a power take off shaft disposed in the space extending anteriorly and driven by the motive power source for powering a powered attachment adapted to be disposed at the anterior of the tractor.

In accordance with yet another embodiment, a tractor is provided comprising base for supporting a motive power source, left and right driven wheels and a transmission for driving the left and right wheels; a handle structure coupled to the base for grasping by an operator from behind the tractor; a drive system for driving the transmission with motive power from the motive power source, further comprising a power take off shaft extending anteriorly and driven by the motive power source for powering a powered attachment disposed at the anterior of the tractor, further comprising a power take off adapter disposed at an anterior location on said tractor having a power coupling driven by said power take off shaft, said adapter allowing a single operator to connect and disconnect a powered attachment by manipulating handles of the handle structure of the tractor from an operator's position.

In accordance with one embodiment of the current invention, a self propelled walk behind hand tractor has a power deck whereon is mounted the motive source (motor) having a horizontal power output shaft, a pair of drive wheels fastened to left and right transmissions powered by the motor, a power take off (PTO) shaft in a horizontal plane approximating the centerline of the tractor, also driven by the motive source with a clutch for engagement and disengagement by the operator, an attachment adapter plate affixed to the anterior of the hand tractor, and a handle bar assembly with respective control groups affixed to the posterior portion of the power deck.

The power output shaft of the motive source is configured to drive the PTO and the motion power train through respective belt and pulley arrangements disposed in a substantially vertical plane. A pulley drives the left and right transmissions with a belt loop and constant tension idler arm and idler pulley configuration. Each transmission is supplied with an input shaft to which is fastened a driven pulley and an output shaft coupled to the respective ground engaging wheel. Each transmission is equipped with a speed control lever regulator which permits adjustment of the ratio of the output ground engaging wheel to the input shaft within a continuous range from reverse through neutral, where the respective ground engaging wheel is idle, to a maximum forward speed.

In one embodiment, there are primary and secondary left and right control levers mounted to the handles of the hand tractor as well as an omni-directional control lever preferably centered in the control panel of the hand tractor and preferably with a cruise control selector, for example, of the friction type. The primary control levers are pivotally mounted and controlled by the operator's fore fingers like a bicycle brake. In one embodiment, these levers are of the general design seen in the prior art of Berrios U.S. Pat. No. 4,920,733. These primary control levers are directly connected to the respective speed control lever regulators on the transmissions through linkages and pivot arms. After the operator urges the omni-directional control lever forward with the cruise control feature deployed, the hand tractor can be slowed down, stopped or caused to go in reverse as the operator applies a squeeze force to the respective primary lever. The operator can effect a turn in this way by slowing down or reversing the direction of the respective wheel. The secondary control levers are generally a pair of thumb actuated levers that pivot off the left and right handlebars adjacent to the handle grips. These thumb levers are of the general design found in the prior art of Wenzel U.S. Pat. No. 4,920,734. The secondary control levers ride on a ball bearing affixed to the end of the control rod fitted to the primary levers. As the secondary control levers are urged downward by the operator's thumbs, the bearing rides along the flat surface of the secondary control levers thereby urging the primary control levers downward effectively speeding up the respective wheel. The operator can effect a turn in this way by speeding up the selected wheel.

An omni-directional control lever is provided, preferably centered in the control panel on the handle. The tractor may be provided only with the omni-directional control, without the primary and secondary controls, if desired. The single control lever, effectively a joystick, is preferably operated through a spherical ball flange bearing. The center of the spherical ball flange bearing is rigidly affixed under the control panel. The housing of the spherical flange bearing is bolted to a control bracket. The control bracket is comprised of an inverted U shaped channel bracket where the bottom of the U is bolted to the housing of the spherical ball flange bearing and the sides of the U are fitted with forward facing flanges. These flanges are equipped with holes to connect to control linkages, e.g., control rods. The control lever handle is fastened to the bottom of the U shaped bracket concentric to the spherical ball rigidly affixed under the control panel with a shoulder bolt. The axis of the shoulder bolt is concentric to the control lever handle and centered to a slot in the center of the control panel. The omni-directional control lever is fitted with an anti-rotational device and a pressure sensitive presence control switch. The anti-rotational device allows the control lever to move with a rocking motion forward and aft, left or right or axially along any direction between these axes (but not rotate) while preventing the rotation of the spherical ball bearing flange that could damage or lock the control rods. The back of the U shaped control bracket preferably has a formed tab fitted to receive a shoulder bolt. The axis of the shoulder bolt is parallel to the bottom of the U shaped bracket and centered to the housing of the ball bearing. The shoulder bolt is fitted to ride in a slot in a stop bracket affixed under the control panel. The control rod linkages are fitted to the holes in the forward facing flanges of the control bracket. These linkages connect to pivot arms that rotate on split pivot rods affixed to the underside of the power deck. The split pivot rods allow for independent motion control of both left and right seamless transmissions/transaxles from reverse through neutral to a maximum forward speed through actuation of the single control lever (and also through operation of the handle-mounted controls). A roller bearing is affixed to the far end of each speed control lever regulator on the respective transmission. The roller bearings ride in V shaped plates affixed to the end of the linkages connected to the respective pivot arms. The V shaped plates are provided with spring tension to maintain constant contact between the V shaped plates and the corresponding roller bearings. A friction device is preferably configured on the pivot rod which can be deployed by the operator to allow for a determined course or disengaged to allow the single lever control of both transmissions with a return to neutral. This configuration allows the operator to steer the tractor as needed with the left and right control levers beyond the course selected by the single lever control and when the hand controls are released the hand tractor returns to the prescribed course. When the single lever hand control is deployed, the roller bearings stay centered in the V shaped plates as the transmission speed control lever regulators are urged into movement by the action of the single lever hand control. The left and right hand controls are directly linked to the speed control lever regulators and when the operator manipulates either or both of the left and right hand controls it directs the roller bearings to ride up or down the V shaped plates, effectively enabling the operator to redirect the tractor from the prescribed course to a new course. When the left or right hand controls are then released, the roller bearings are urged back to the center of the V shaped plates by spring tension between the V shaped plate and the roller bearing, returning the hand tractor to the originally prescribed course.

A second pulley on the motor is belt connected to the driven pulley fastened to the PTO drive line located below the drive pulley on the motor. The PTO is preferably engaged and disengaged with a mechanical clutch brake with an electro-mechanical actuator, for example, an electric motor driven vacuum pump actuator. An electromagnetic clutch or a movable idler pulley and a driven pulley brake configuration could be alternatively arranged without departing from the spirit of the invention. An electrical interlock circuit is provided with presence switches on both handle grips and one presence switch on the omni-directional single hand control lever. This circuit only allows PTO engagement when the operator is present. The switches are further configured to only allow activation of the motor starter solenoid when the PTO switch is in the disengaged position and the parking brake is applied, effectively preventing the operator from starting the engine with the PTO engaged or transmission out of neutral.

The PTO driven pulley is sized to provide for proper speed reduction to the PTO drive line. In a preferred embodiment, the pulley is sized to effect a 3 to 1 speed reduction. This supplies a PTO speed to approximate 1000 RPM. This enables the current invention to power attachments such as a snow thrower or a power sweeper without further need for speed reducing transmissions or additional pulleys and belts. It should be noted that this configuration enables the tractor to be easily modified for differing PTO speed requirements as necessary by simply changing the ratio of the pulleys and fitting the belt. The PTO driveline is positioned in the centerline of the tractor in the narrow passage created between the left and right transaxles and is supported by bearings. The bearing closest to the driven pulley is mounted in front of the driven pulley, on a flange attached to the rear housings of the transaxles. This arrangement allows for easy belt removal and replacement affording space behind the pulley to fit the belt. It also doubles as a reinforcement supporting and tying the two transaxles together. The posterior end of the PTO driveshaft protrudes beyond the pulley and has provisions for a connection means as the rear PTO attachment through an access hole in the power deck. This end mates with a corresponding mating driveshaft on the rear attachment. The driven pulley is affixed to the driveline behind the roller bearings and in front of the lower portion of the power deck. The anterior end of the PTO driveline is supported by another bearing secured to a mounting flange affixed to the inside of the front attachment adapter housing. The front attachment adapter housing is configured to support the left and right transaxles on top and bottom with standard hardware affixed at suitable mounting points at the top and bottom of the left and right transaxles. The front attachment adapter housing continues rearward and connects to the lower leading edge of the power deck with two pivot pins or bolts. This unique configuration allows for the front attachment adapter housing to pivot away from the rear power deck when the top mounting bolts and the rear driveline are disconnected, enabling ease of service. The anterior end of the PTO driveline is splined and fitted to receive a spring loaded self aligning coupler. The spring loaded self aligning sliding coupler is accessed through an opening and resides at the very edge of that opening in the front attachment adapter housing. In this way the coupler can recoil and self align when mated with the mating driven coupler of the chosen front attachment.

The front PTO attachment adapter is comprised of a vertical plate affixed with left and right guiding rails. The guiding rails are spaced on either side of the driveshaft. The guiding rails are positioned in a trapezoidal relationship. Whereas the top and bottom edges of the guiding rails are parallel, the left and right sides of the guiding rails form a trapezoid, narrowing to the top. This configuration allows for self alignment when coupling attachments. The top edges of the guiding rails are beveled rearwards thereby effecting a ramp forming a top mounted connecting hook. The top mounted connecting hook is positioned to be in the line of sight of the operator enabling easy grappling of attachments by a single unaided operator. The bottom leading edges of the guiding rails are rounded enabling easy engagement. The mating receiver plate is connected to a corresponding attachment. The receiver plate is also trapezoidal and configured to mate directly to the attachment adapter on the hand tractor. There are hitch pins on the top and bottom of the receiver plate forming the two parallel sides of the trapezoid on the receiver plate.

The hand tractor is equipped with a latching mechanism comprised of a cable or rod actuated hook engaged with a lever mounted to the handle. In this way, the operator can remove and install attachments from the operator's position. The latch protrudes through an opening in the front PTO attachment adapter housing and is positioned directly below the spring loaded sliding power coupler access opening.

To couple an attachment, the operator lifts the handles of the hand tractor slightly thereby guiding the top mounted connecting hook to engage the corresponding pin on the top of the receiver plate of the attachment. The operator then eases the handles downward causing the front of the tractor to move upward as the weight of the tractor naturally urges the tractor to engage the latching mechanism with the mating hitch pin on the bottom of the receiver plate of the attachment. With the latch engaged with the hitch pin on the bottom of the receiver plate the latching mechanism can then be deployed by the operator. The operator pulls the lever rearward causing the lever on the latching mechanism to go over center. The hitch pin on the bottom of the receiver plate is guided along the rounded leading edges on the bottom of the guiding rails. In this way the two vertical plates on the tractor and the attachment align and the spring loaded self aligning coupler engages with the driven coupler on the attachment. The PTO on the tractor can now be engaged by operating the clutch.

To disconnect an attachment, the operator releases the lever on the latching mechanism and the handles are slightly lifted, causing the front of the tractor to move downwardly. A secondary cable actuated by a trigger on the handle lifts the latch away from its mating point on the attachment and the hand tractor is moved further down at the front and away by the operator, disengaging the top mounted connecting hook from its mating pin on the attachment. The hand tractor is now separated from the attachment.

Other objects, features and advantages of the present invention will be apparent from the following detailed description.

BRIEF DESCRIPTION OF THE DRAWINGS

The invention will now be described in greater detail in the following detailed description with reference to the drawings in which:

FIG. 2 is a front view of the tractor;

FIG. 2A is a side view of a detail of a portion of the PTO attachment adapter showing the power coupler;

FIG. 2B is a side view of the PTO attachment adapter showing the top rearward bevel forming the connecting hook and the rounded bottom edges of the guiding rails;

FIG. 3 shows the receiver plate disposed on an attachment to allow the attachment to be coupled to the PTO attachment adapter;

FIG. 5 is a detail of the controls and linkages with the body of the tractor not shown;

FIG. 6 is a detail of a part of the split pivot rod structure for the controls for the tractor;

FIG. 7 is a top view of the hand controls on the handles;

FIG. 19A shows the control linkage of FIG. 19 in its released state;

FIGS. 23A-C show details of the cruise control mechanism for the single lever hand control, in particular, FIG. 23A shows a side view, FIG. 23B shows how the cruise control attaches to the control linkage and FIG. 23C shows a top view.

DETAILED DESCRIPTION OF THE DRAWINGS

Figure 1:
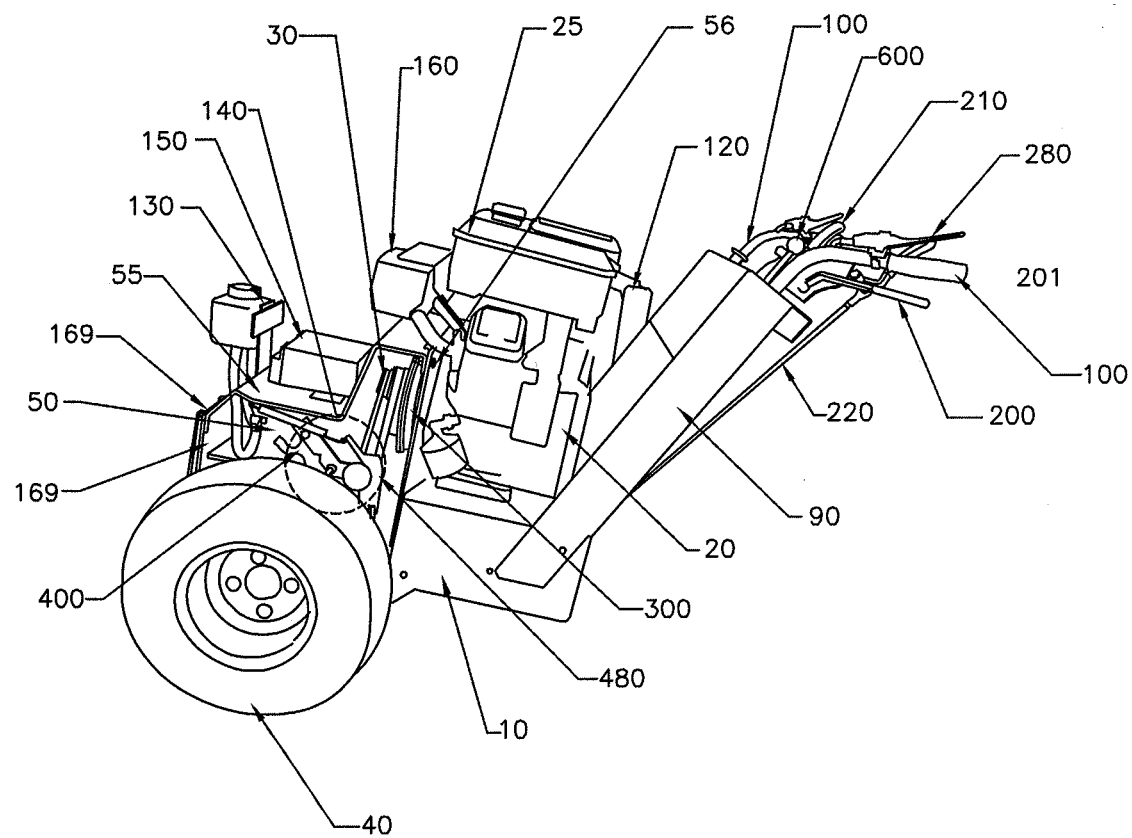
FIG. 1 is a left side perspective view of the tractor according to the invention.
Figure 4:
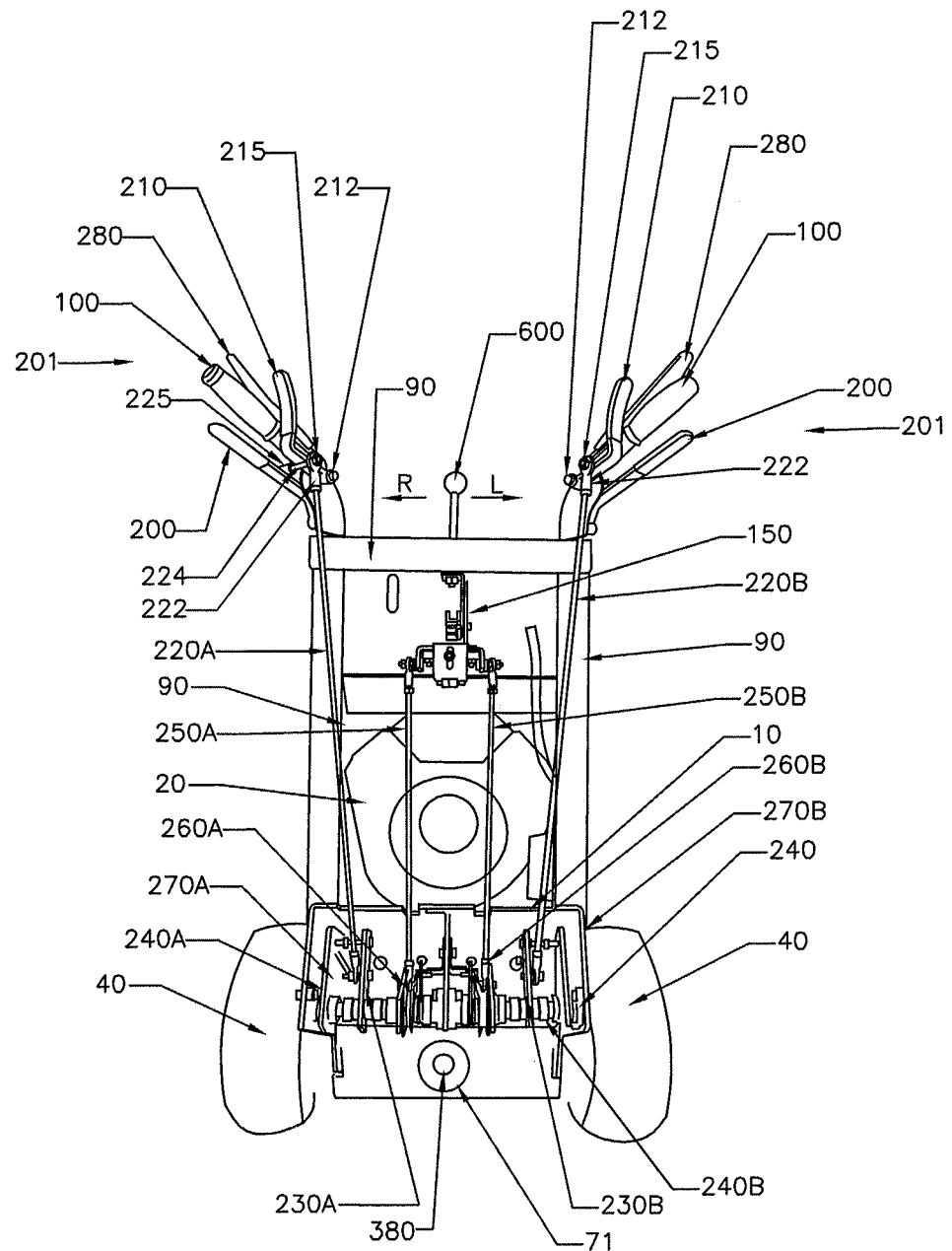
FIG. 4 is a rear view of the tractor showing the controls, control rods and pivot rods.

With reference now to the drawings, FIG. 1 is a left side view of the walk-behind tractor with dual hydrostatic drive according to the present invention. FIG. 2 is a front view of the tractor 1 and FIG. 4 is a rear view. The tractor comprises a power deck 10 to which an internal combustion engine 20, for example, a V twin engine as shown, is mounted. The internal combustion engine may be any suitable engine and of any suitable design. Alternatively, another motive power source could be used. The invention applies to any type of motive power source. As is conventional, the internal combustion engine 20 includes a fuel tank 25, battery 15 for starting and ignition and suitable generator/alternator, exhaust system/muffler 160 and suitable known accessory systems to enable engine operation. In the tractor shown, the engine comprises a horizontal shaft engine having its power shaft as indicate at 30 facing the front of the tractor.

Figure 8:
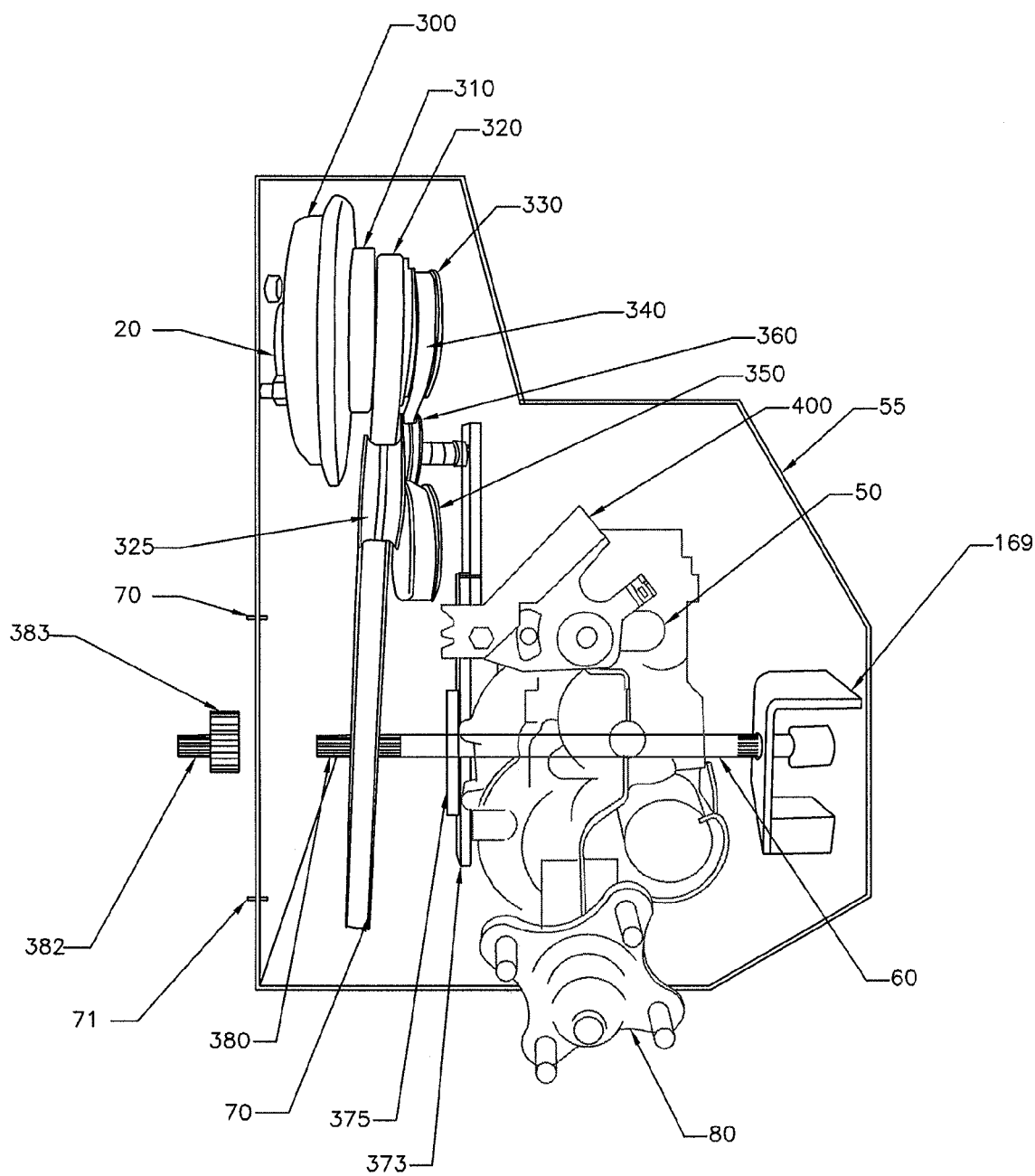
FIG. 8 is a detail of the right hydrostatic transmission and part of its control arrangement as well as the pulley system that drives the pumps for the hydrostatic transmissions and the PTO pulley system that drives the front PTO and also shows the rear PTO spline stub shaft and access hole through the bottom of the power deck.

Mounted to the power deck 10 of the tractor is the front attachment adapter housing 55 (FIG. 2, FIG. 8). Two hydrostatic transmissions 50 (FIG. 2) are mounted side by side to the adapter housing 55. Left and right wheels 40 are driven by output shafts of the respective transmissions. The transmissions are conventional and of known construction. As well known, each transmission has a driven pump to develop hydraulic pressure, which is pumped to drive a hydraulic motor. The right side transmission 50 is shown in greater detail in FIGS. 8 and 9. The adapter housing 55 is attached to the power deck 10, for example, by bolting. Preferably, the adapter housing 55 is bolted to the power deck 10 as shown at 56 at both sides at the top. These bolts can be removed to obtain access to the drive belts for service. A hinge is provided at the bottom of the adapter housing 55 where it connects to the power deck 10. This allows the adapter housing 55 to hinge away from the power deck to allow for easy belt access/replacement.

As shown in FIG. 8, between the right transmission shown in phantom and the left transmission (not shown) which forms a mirror image of the right transmission, a power takeoff (PTO) shaft 60 driven by a PTO pulley 70 is provided. The power take off shaft 60 is utilized to provide power to powered attachments that can be connected to the tractor via an attachment adapter, which will be explained in greater detail below. In FIG. 8, the transmission right drive wheel axle is shown at 80.

Although the illustrated embodiment shows a tractor having an internal combustion engine and dual hydrostatic transmissions, a different power source could be employed, for example, an electric motor driven by batteries. Further, the hydrostatic transmissions could be replaced by dual electric motors and an all-electric drive system could be employed, with the same effect as dual hydrostatic transmissions. Further, a hybrid internal combustion engine/electric motor drive system could be used, for example, an internal combustion engine (ICE) driving a generator powering the electric motors with electrical control. Such a hybrid system could be designed with or without electrical storage batteries, but would have the same functionality as the embodiment described herein.

Turning again to FIG. 1, attached to the power deck 10 is a handle structure 90 to which left and right handles 100 are attached. Left and right hand controls, to be described later, are provided on each handle 100.

Also provided on the handle structure 90 is an engage and release operating mechanism 120, shown in the released state, for the front power take off adapter which enables single operator connection and disconnection of powered attachments. This will be described in greater detail in connection with FIG. 19.

A hydraulic reservoir 130 is provided for hydraulic fluid which is used in the dual hydrostatic transmissions 50. As well known, a hydrostatic transmission comprises a pump driven by the motive power source that pumps hydraulic fluid to a hydraulic motor which drives the driven component, in this case, a drive wheel. The hydrostatic transmission enables the corresponding wheel to be driven seamlessly between reverse, neutral and forward operating modes. Since each of the transmissions for left and right can be controlled independently, the dual hydrostatic transmission drive employed in the present invention allows turns to be made by driving one wheel faster than the other or with one wheel in neutral and furthermore, allows a zero radius turn by controlling one transmission in reverse and the other forward.

According to the invention, as shown by the dashed inset circle in FIG. 1, a control mechanism 140 for controlling each of the hydrostatic transmissions is provided. This control mechanism, which will be described in greater detail in connection with FIGS. 9-12 relating to the control linkages, allows the tractor to be controlled by the left and right hand controls 201 and further according to the invention, alternatively, by a single control lever 600 of the joystick type that controls a mechanism 150 (FIG. 4). This feature allows the tractor according to the present invention to be controlled with a single hand, thereby leaving the second hand free to control other functions, for example, the chute direction control of a snow blower/snow thrower attachment. The transmission control mechanism is denoted generally by reference numeral 140 and shown by the encircled area in FIG. 1.

Although the invention contemplates that the single hand control mechanism 150 is provided as an additional control mechanism to the hand controls 201, it may be provided as the only control mechanism for the tractor, and the left and right hand controls 201 can be eliminated.

The single hand control mechanism is shown at 150 operated by lever 600 (FIGS. 4 and 5) and will be described in greater detail later. The single hand control mechanism is of the joystick type, allowing fore and aft control from a control neutral position to provide forward and reverse motion in which case each of the wheels are driven equally in the forward and reverse direction to allow a straight ahead path, and further allowing for left and right control by moving the joystick control in a transverse direction. According to the present invention, the joystick control is configured so that when the joystick is moved to the left, the tractor will move to the right because the left wheel will be speeded up and the right wheel slowed down. If the joystick control is moved to the right, the tractor will accordingly move to the left. This is intuitive because movement of the joystick control left and right will entail corresponding movement of the back end of the tractor in that direction.

As will be explained below, the controls of the preferred embodiment of the present invention allow the operator to use either the dual hand controls 201 or the single lever control 600. If the single lever control 600 is being used, it can be set to a prescribed course via a cruise control feature, preferably of the friction type. The dual hand controls can then be used to override the single lever control, in which case, when the dual hand controls are released, the tractor returns to the prescribed course set by the single lever control. If the single lever control is in neutral, return is, of course, to neutral.

The tractor preferably includes an electric power source, i.e., a battery 151, for powering an electric starter for the internal combustion engine and for other accessory controls, e.g., an electrically controlled PTO clutch.

Turning to FIG. 2, the front end of the tractor is shown. In particular, at the front end, disposed on the adapter housing 55 that houses the dual hydrostatic transmissions for the left and right wheels, is an attachment adapter plate 169. A power take off sliding coupler 170 is provided extending through an opening in plate 169. The power take off coupler 170 includes a coupling jaw 172 shown in greater detail in FIG. 2A that is adapted to engage with a mating coupling jaw 174 that is provided on the receiver plate 171 of the attachment that is to be powered, as shown in FIG. 3. The coupling jaw 172 is slidably splined to the PTO shaft 60 and spring biased outwardly by a spring 173. As shown in FIG. 2, the attachment adapter plate 169 is disposed on the front of adapter housing 55 and includes two rails 180 that are inclined inwardly so that they are more closely spaced together at the top than at the bottom, forming a trapezoidal arrangement. As shown in the side view of FIG. 2B, the rails 180 each include a rearwardly sloped ramp 182 provided at their top surfaces that are adapted to engage a pin 184 provided on the receiver plate 171 of the attachment (FIG. 3). At the bottom of each of the rails 180, the rail is rounded as shown at 186 to allow the lower pin 188 of the attachment receiver plate 171 to be slidably received beneath it. A locking jaw 190 which is manipulated by the operator locks the attachment in place by locking down on the pin 188. The locking jaw, which moves both vertically and horizontally to pull the attachment into position and to lock it down is manipulated by a control mechanism 120 provided on the handle structure 90. This will be described in greater detail in connection with FIG. 19.

As previously described, the preferred embodiment of the tractor according to the present invention provides a dual control mechanism for operating the tractor. The tractor includes left and right conventional hand controls that allow two handed control of the tractor. Furthermore, the present invention provides a joystick single lever control that allows complete control of the tractor movement via one hand. FIG. 4 shows a rear view of the tractor showing the left and right hand controls 201 as well as the single hand control mechanism 150 controlled by lever 600.

In particular, each of the left and right handles 100 include a primary finger control 200 that is pulled upwardly for reverse movement, that is, for driving the respective wheel 40 in a reverse direction. The controls further comprise a secondary thumb operated control 210 which is pushed downwardly to achieve forward movement. In particular, the thumb control 210 is mounted on a pivot 212. A control rod attachment pivot 215 is provided to which a control rod 220 is attached by a ball joint rod end 222. The pivot 215 is mounted to a shaft 224 that is affixed to control lever 200 at fixation point 225. A bearing surface is provided on the shaft 224. The bearing surface is disposed between the fixation point 225 on the primary control lever 200 and the control rod end that is fitted with the ball joint rod end 222 at pivot 215. The bearing surface rides on a flat under-side portion of the secondary control lever 210. As the secondary control lever 210 is urged against the bearing surface, the control rod 220 is moved downwardly, thus causing the tractor drive wheel 40 to move in the forward direction.

Control rods 220A and 220B for the left and right transmissions respectively are each coupled to control levers 230A and 230B, respectively, mounted on a split shaft 240A, 240B, near the bottom of the tractor at the rear lower portion of the power deck 10. The split shaft comprises left and right portions 240A and 240B which are independent and separated at the center line of the tractor. In particular, the levers 230A and 230B freely rotate on their corresponding split shafts 240A and 240B. Each lever 230A, 230B controls a linkage that is directed anteriorly and which will be described in greater detail in connection with FIG. 10, to control the corresponding left or right transmission. Lever 230A is on the left side and lever 230B is on the right side. As used herein, the letters A and B will denote left and right, respectively, where corresponding mechanisms are provided for left and right sides. For example, control rods 220 for the left and right sides are designated 220A and 220B, respectively.

The single hand joystick mechanism 150, which will be described in greater detail in connection with FIGS. 13-16, controls two control rods 250A and 250B which likewise control the left and right transmissions. Control rods 250A and 250B are connected to respective levers 260A and 260B also provided on corresponding ones of the split shafts 240A and 240B. However, these levers 260 are pinned, keyed, or splined to the respective split shafts 240A and 240B so that the shaft rotates when the lever 260 is rotated. Also pinned, keyed or splined to the shaft 240 is a further lever 270, one for left (270A) and right (270B), which rotates with the corresponding split shaft 240A or 240B. Thus, when the single lever control mechanism 150 is manipulated to move the control rods 250A and 250B, thereby causing rotation of the levers 260A and 260B, the corresponding levers 270A and 270B rotate together with the shaft 240A, 240B to control the corresponding left and right transmissions via a linkage to be described in greater detail in connection with FIG. 12.

A spring loaded presence control 280 is preferably provided on each handle 100 for operator safety. The control 280 operates a respective electrical switch (not shown) to indicate operator presence when depressed. A presence control switch is also provided on the single lever hand control 150. The spring loaded presence controls 280 and on the single lever control 150 will ground or otherwise disable the ignition of the engine when the operator's hands are removed from all of the control levers (at least one control must remain in the operator's hand for the engine not to be shut off).

For safety, a parking lever (not shown) preferably must be set to start the engine. At least one presence control must be depressed to keep the engine running when the parking brake is disengaged. The engine is also preferably arranged so that it will not start with the PTO engaged. Thus, the engine can be started only if the parking brake is on and the PTO is disengaged.

As described, single hand control 150 likewise contains a presence/deadman switch that requires the control to be pressed downwardly to ensure that an operator is present. Should the operator not be present to hold down the control 150 (assuming neither of the controls 280 are depressed), the engine will be stopped. The control 150 can be operated with a single hand, leaving the other hand free to perform other task related to the tractor, for example, manipulation of a snow thrower chute or some other function.

FIG. 5 shows the control linkage unobstructed from the rear by the rest of the tractor. FIG. 6 shows details of the control linkage for the single hand control 150 including details of the control lever 260A and the control rod 250A. Each of the levers includes a spring 265 to urge the lever arm to the neutral position.

FIG. 7 shows a top view of the two hand controls 201 and the handles 100. In addition to the left and right hand controls 201 and the lever 600 for the single hand control 150, additional functions include a starter switch 92, a power take off clutch engage switch 94 and a cruise control selector lever 800.

FIG. 8 shows the right side transmission 50 mounted in the adapter housing 55. The output shaft of the engine 20 is coupled to a power take off clutch 300 which may be of any convenient design including spring actuated mechanical, electromagnetic, etc., as known to those of skill in the art. The present invention preferably utilizes a spring loaded mechanical clutch driven by a control linkage, not shown. In a preferred embodiment, a vacuum operated servo mechanism is utilized powered by an electrically driven vacuum pump. The vacuum pump is energized to provide a vacuum which operates a diaphragm to operate the clutch linkage to engage the clutch. Coupled to the output side of the clutch is a first pulley 310 to which a belt 320 is affixed which drives a power takeoff pulley 70 which preferably has a diameter three times that of the pulley 310 on the clutch to provide a 3-1 speed reduction. A spring loaded idler pulley 325 of conventional design is provided to ensure adequate tension on the belt 320. Further affixed to the clutch output is a further drive pulley 330 which drives a belt 340 to operate the driven pulleys 350 for the hydraulic pumps of each of the left and right hydrostatic transmissions 50. Tension on belt 340 is provided by an idler/tension pulley 360 of conventional design. The details of the connection of the pulleys 350 to the hydrostatic transmissions 50 are not shown in FIG. 8.

According to the invention, a rear PTO can also be provided driven by pulley 70 through a shaft stub off pulley 70 and extending rearwardly.

The rear PTO is provided by a splined shaft stub 380 of shaft 60 on which driven pulley 70 is mounted. It is accessible through an opening 71 provided in the rear of the front adapter housing 55 (see FIG. 4). A conventional splined driven member 382 is adapted to lock with a conventional spring loaded lock 383 on the splined shaft stub 380 to drive a rear mounted attachment. Driven pulley 70 and shaft 60 are supported by a bearing 375 mounted on a bearing support bracket 373 (FIGS. 8 and 20) mounted between transmissions 50.

Figure 20:
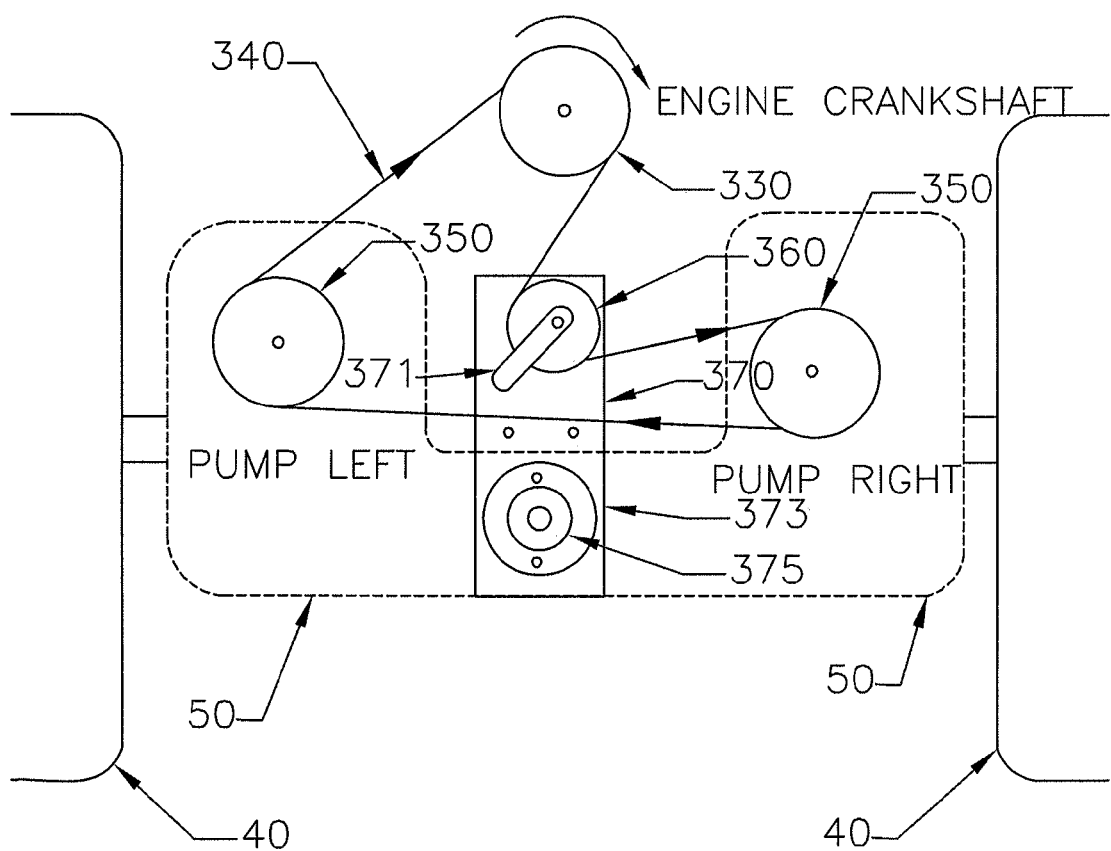
FIG. 20 shows the pulley and belt drive arrangement for driving the dual transmissions and the rear bearing support bracket shown in a front view.

FIG. 20 shows in a rear view, the arrangement of the engine crankshaft pulley 330 and the left and right transmission hydraulic pump pulleys 350 and idler pulley 360. The hydrostatic transmissions 50 are shown schematically. Idler pulley 360 is mounted to idler pulley bracket 370 through a slotted hole 371 in the bracket. Idler pulley bracket 370 is fastened to the bearing support bracket 373 bolted between the left and right transmissions 50.

Figure 22:
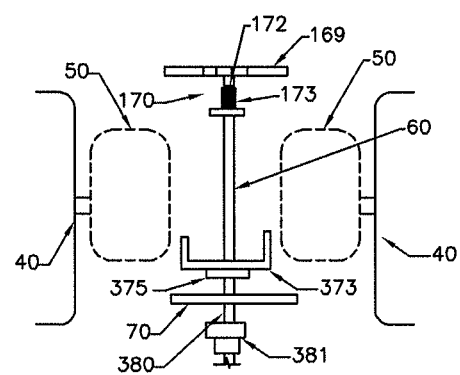
FIG. 22 shows the drive shaft between the transmissions for the front PTO and the rear PTO in a top view.

FIG. 22 is a top view of the shaft 60 which provides the front and rear PTOs. The shaft 60 is provided in the bearing 375 on a space between the transmissions 50, shown only schematically. The shaft 60 is supported by a bracket 373 bolted between the transmissions.

Figure 21:
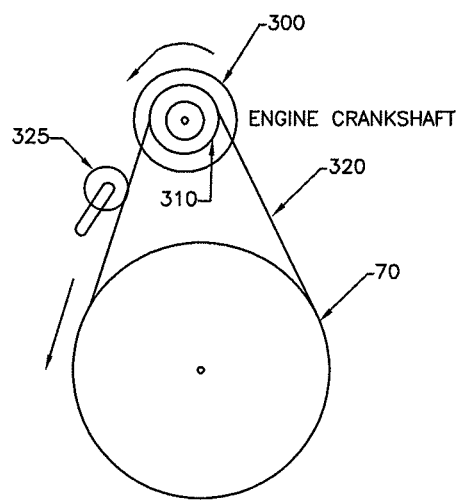
FIG. 21 shows the pulley and belt drive arrangement for driving the front PTO in a rear view.

FIG. 21 shows, in a front view, the pulley and belt arrangement for the engine crankshaft pulley 320 driven by the clutch 300, the PTO pulley 70 and spring loaded idler 325. In both FIGS. 20 and 21, the directions of motion are shown by the arrows. FIG. 20 shows the pulley arrangement from the rear of the tractor and FIG. 21 shows the PTO pulley arrangement viewed from the front.

Figure 9A:
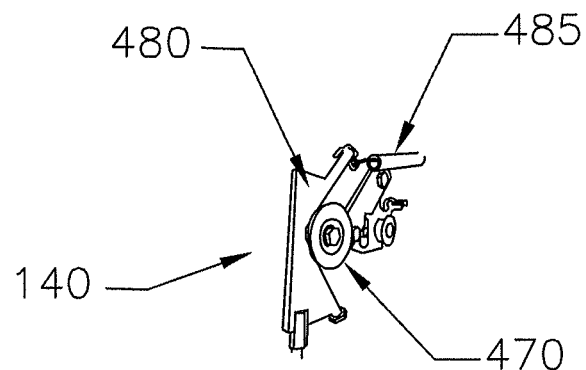
FIG. 9A shows a perspective view of the control system of FIG. 9 at one of the transmissions.
Figure 9:
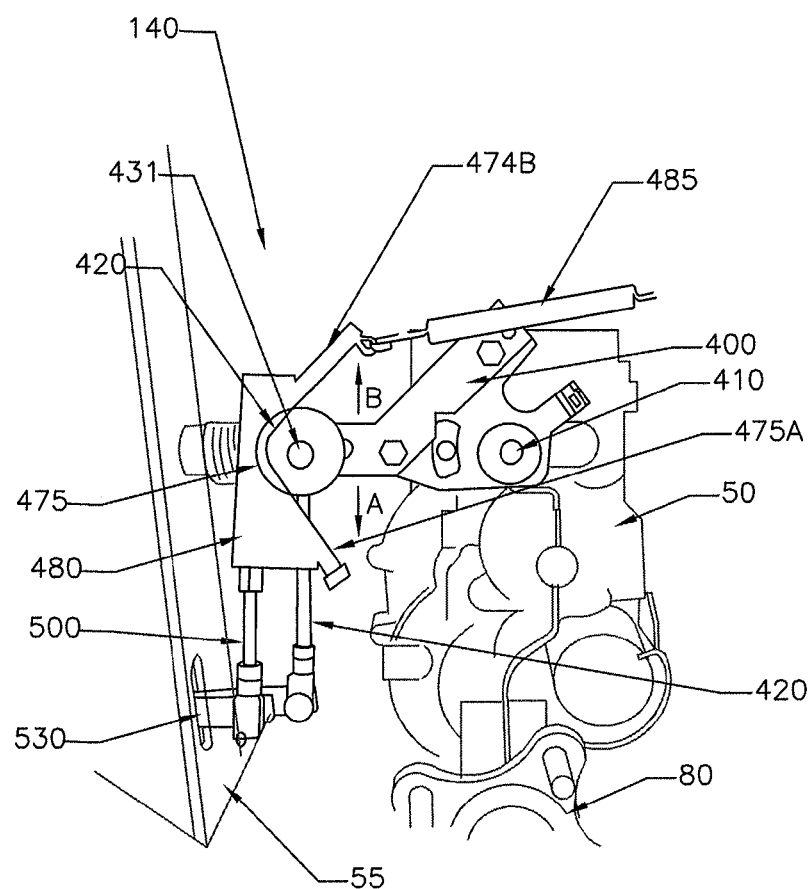
FIG. 9 shows a further detail of the right side hydrostatic transmission and the control system for controlling they hydrostatic transmission according to the invention.

Turning now to FIG. 9, the right side transmission 50 is shown. The left side transmission is disposed on the left side and is a mirror image of the arrangement shown for the right side in FIG. 9.

Figure 10:
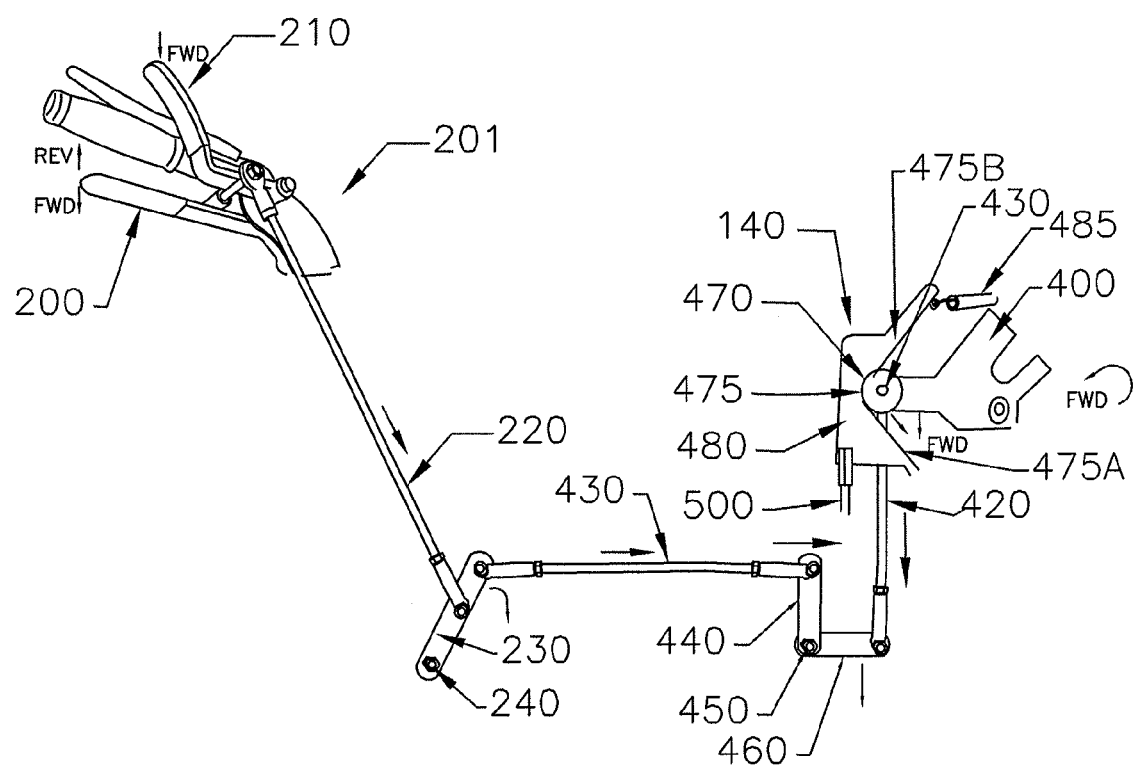
FIG. 10 shows schematically the right side control linkage operated by the right side hand controls for controlling the right side transmission, there being a mirror image linkage for the left side transmission.

Hydrostatic transmission 50 includes a speed control regulator lever 400 which is operated to rotate a shaft 410 of the transmission to control speed and direction of the driven wheel. When the lever is rotated in the direction indicated by arrow A, that is downwardly, drive axle 80 moves in the direction shown by arrow C, that is, forwardly. The greater the rotation of the lever A, the greater the forward speed. Conversely, when the lever is moved in the direction shown by arrow B, the driven axle 80 is driven in reverse. Lever 400 is directly pivotally coupled to a control rod 420 via a pivot point 430. Rod 420 is operated by the hand control 201 for the right side. FIG. 10 shows the right side transmission control but the left side is a mirror image of the right side control.

Figure 11:
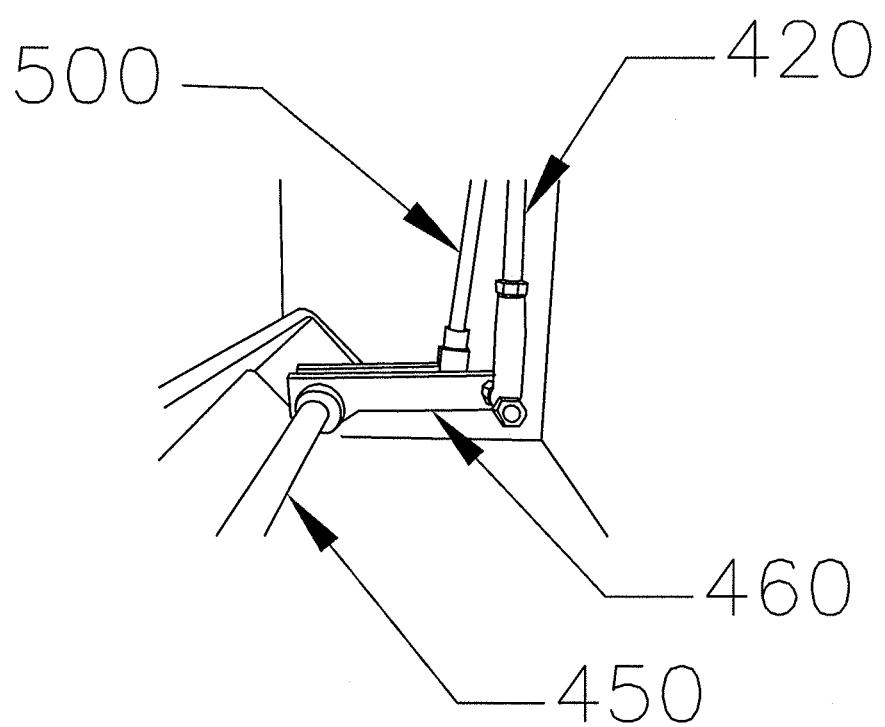
FIG. 11 shows a detail of the control linkage of FIGS. 10 and 12.
Figure 12:
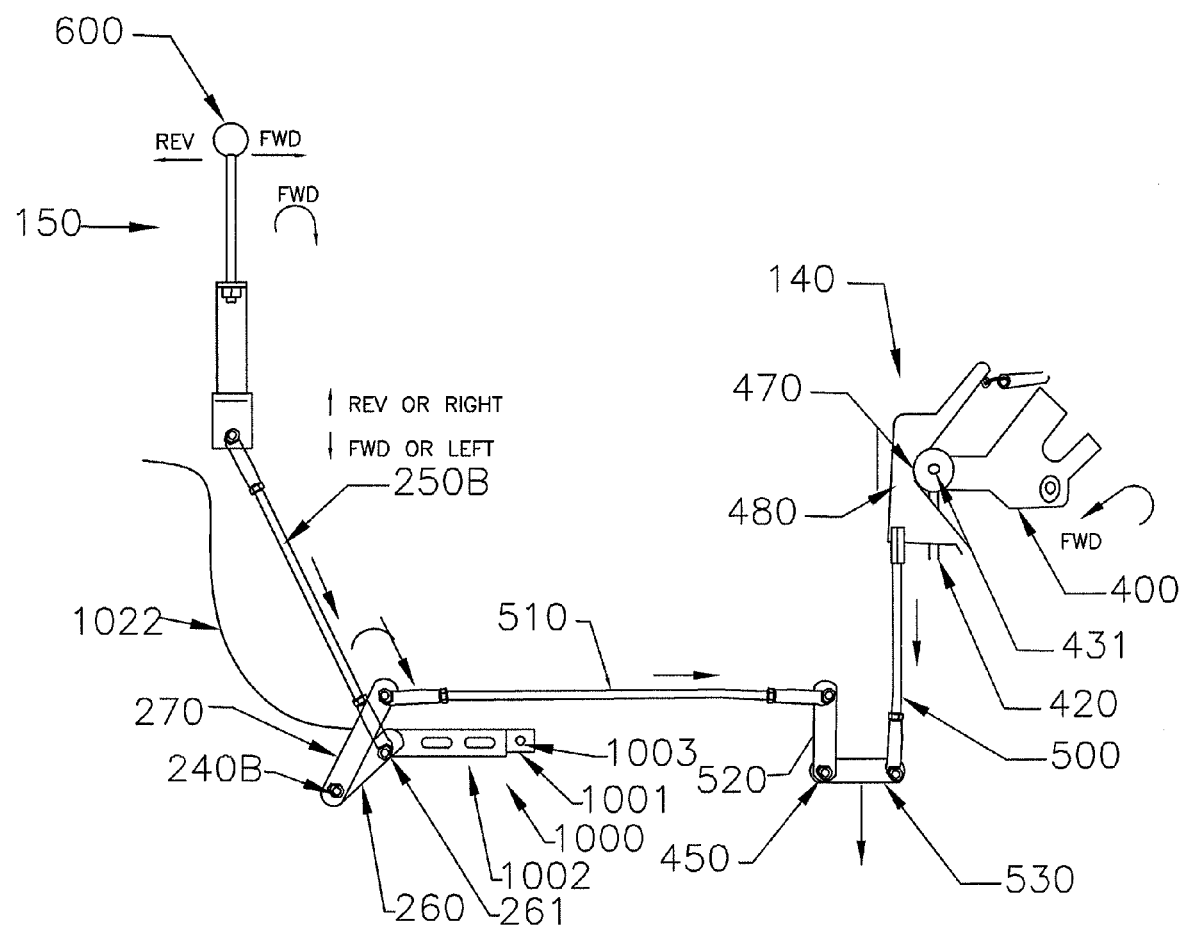
FIG. 12 shows schematically the control linkage for the single hand joystick control lever for controlling the right side transmission according to the present invention, there being a mirror image linkage for the left side transmission.

Turning to FIG. 10, when secondary thumb lever 210 is controlled downwardly, that is, to move the corresponding wheel in the forward direction, control rod 220 is moved downwardly in the direction of the arrow shown in FIG. 10. This causes lever 230, which is mounted on the split shaft 240, to rotate clockwise as shown in FIG. 10. This causes intermediate control rod 430 to move in the forward direction controlling the lever 440 to rotate clockwise about a pivot shaft 450. Details of this construction are shown in FIG. 11. Pivot shaft 450 is disposed at the front of power deck 10, near where power desk 10 joins to adapter housing 55. A lever 460 is rigidly connected to the lever 440 forming a bellcrank and pivots about the shaft 450 together with the lever 440 downwardly as shown in FIG. 10. This causes the control rod 420 to move downwardly and thus rotate speed regulator level 400 downwardly causing the right transmission to move axle 80 in the forward direction. The speed of wheel 40 depends on the amount of movement of the rod 420 and accordingly the amount that the thumb lever 210 is depressed. Rod 420 is pivotally connected at the pivot 431 to the lever arm 400 and thus moves the lever arm 400 in the counterclockwise direction. Pivot 431 includes a roller bearing arrangement which has mounted thereto a flanged roller bearing pulley 470 which rides on a V shaped track 475 of a V shaped bracket 480 of the mechanism 140. The V shaped bracket 480 is biased against the flanged roller bearing pulley 470 by a spring 485. As will be explained later, the V shaped bracket 480 is affixed to a control rod 500 which is coupled via another linkage to the single lever control mechanism 150 (FIG. 12).

This arrangement allows the flanged pulley 470 to ride on the V shaped track or cam surface 475. If the transmission is being controlled in the forward direction, that is, so that lever 400 moves counterclockwise or downwardly, the pulley 470 accordingly moves downwardly on the track 475A against the loading of the spring 485. Thus, as the pulley 470 moves downwardly on the track 475A, the spring loaded bracket 480 moves away from the control lever 400.

When the corresponding wheel 40 is being moved in the reverse direction, the pulley 470 will move upwardly on the track 475B against the bias of the spring 485. See FIG. 9. This will occur when the operator pulls up on the primary finger control 200, for operation in reverse speed.

As will be explained below, this arrangement allows the left and right controls 201 to be used concurrently with (or alternatively to) the single lever control mechanism 150.

The vertical position of the V shaped bracket 480 is determined by the position of the single lever hand control 150 as will be explained below. That position corresponds to a neutral position when the V shaped bracket 480 is at a mid point of its upward and downward travel. In this case, when the single-lever hand control 150 is in the neutral position, the roller pulley 470 rides up and down the track 475A, 475B depending upon operation of the hand controls 201. Should the single-lever hand control 150 be set to a prescribed course, for example, going forward at half speed, the position of the V shaped bracket 480 will be vertically lower and if the hand controls 201 are not used, the pulley 470, disposed at the center of the V shaped bracket, will represent the prescribed course set by the hand control 150. When the single lever hand control 150 is returned to the neutral position, the transmission speed regulator lever 400 will likewise be returned to the neutral position. FIG. 12 shows the linkage for the single lever control 150. FIGS. 13-16 will describe in detail the mechanical operation of the single lever control 150.

The linkage for the single lever control 150 is shown in FIG. 12. FIG. 12 shows the right side linkage. A mirror image of the linkage shown in FIG. 12 will be provided on the left side for the left side transmission.

Turning to FIG. 12, the control rod 250B for the right side transmission is coupled to the right side control flange of the single lever control mechanism 150 which will be described in detail in connection with the description of FIGS. 13-16. Control rod 250B moves in the direction shown by the arrow in FIG. 12 when the corresponding driven wheel is to be driven in the forward direction. The downward motion on rod 250B controls lever 260 clockwise. Lever 260 is splined, keyed or pinned to shaft 240B and accordingly moves lever 270 also splined, keyed or pined to the shaft, in the clockwise direction. This moves an intermediate rod 510 in the forward direction as shown in FIG. 12. The rod 510 is connected via a clevis to a bellcrank composed of levers 520 and 530 which rotate on shaft 450. Lever 530 thereby moves rod 500 downwardly. Rod 500 is directly affixed to the V shaped bracket 480 and thus causes the V shaped bracket to move downwardly. The V shaped bracket 480 is biased against the transmission control lever 400 pulley 470 by spring 485. As a result, downward motion of the bracket 480 moves the lever 400, which stays centered by the pulley 470 at the center of the V shaped bracket 480. At the same time, the control rod 420 moves downwardly controlling the linkage shown in FIG. 10 so that it moves correspondingly thereby controlling the positions of the levers 200 and 210 of the hand controls.

The single lever control mechanism 150 preferably and optionally operates a friction mechanism to hold the lever 600 in a prescribed position. Thus, the vertical position of the V shaped bracket 480 determines the motion of the corresponding transmission in the forward or reverse direction. That is, when the V shaped bracket is moved downwardly, the transmission is engaged so that the wheel moves in forward rotation and when the V shaped bracket 480 is moved upwardly, by a corresponding reverse movement of the lever 600, the transmission is placed in a reverse drive. The position of the V shaped bracket thus determines a prescribed course for the hand controls. When the V shaped bracket is centered, this is a neutral position, corresponding to the neutral position of the hand controls. However, when the V shaped bracket is displaced from the center position, a prescribed course (speed and direction) is determined. Because both transmissions are controlled, a prescribed course is thus set. Should the operator set a prescribed course via the single lever hand control mechanism 150, and thereafter use the hand controls 201, the further operation by the hand controls will override the single lever control 150. In such case, pulley 470 rides up and down the track 475, depending on operation of the hand controls 201. However, upon discontinuing use of the hand controls, the tractor will be returned to the prescribed course determined by the setting of brackets 480 as determined by the setting of control 150.

As should be apparent from a review of FIGS. 10 and 12, when the controls are moved in reverse orientation to that shown, the directions of the arrows reverses and the direction of the driven wheel motion is reversed.

A cruise control mechanism subassembly 1000 shown in FIGS. 23A-C is selected from a lever 800 on the control panel 90 that moves in a J-shaped slot 801 (FIG. 7). When the lever 800 resides in the position 802, the cruise control is selected. See FIG. 7. The cruise control subassembly 1000 of FIG. 23 consists of a fixed plate 1001 and a movable plate 1002. The fixed plate 1001 is affixed to the bottom of the power deck (see FIG. 12) and pivots on a shoulder bolt 1003. Two holes 1004 are provided in fixed plate 1001 to fasten the moveable plate 1002 to the fixed plate 1000. The movable plate 1002 is fashioned with two slotted holes 1006. Two bolts 1008 mounted through holes 1004 and 1006 and provided with compression springs 1010 and lock nuts 1012 provide tension between the fixed and movable plates. A nylon type washer 1014 is provided either between the plates or between the compression spring and the movable plate to allow the plates to slide freely yet hold against the spring tension when the single hand control lever 600 is released. (As long as the operator depresses one of the presence controls 280, the engine will not stop.) The spring tension can be adjusted by adjusting the lock nuts 1012. Two of the cruise control subassemblies 1000 are provided, one for each left and right transmission control. FIG. 12 shows one subassembly 1000 in its engaged position engaging a pin 261 fitted to lever 260. FIG. 12 shows the right transmission control from the single lever control 600. A similar cruise control mechanism 1000 is provided for the left side transmission.

The slotted holes 1006 in the movable plate 1002 are configured to provide only forward motion of the control lever 150. In this way, reverse is locked out when the cruise control is selected. This prevents the operator from using reverse with the cruise control deployed to ensure operator safety when the machine is used in the reverse direction.

The dual plate subassembly 1000 is spring biased by a torsion spring 1015 on the pivot bolt 1003 to engage an extending pin 261 on the lever 260. See FIGS. 23B and 12. A V-notch 1020 on the end of the movable plate 1002 engages the pin 261 when the cruise control is selected. The dual plate subassembly 1000 pivots on a shoulder bolt 1003 that is fastened to the lower portion of the power deck 10. A cable 1022 (FIG. 12) attaches between the subassembly 1000 and the cruise control select lever 800 on the control panel 90 (FIG. 7) and is tensioned against the bias provided by spring 1015.

When the select lever 800 is operated to select the cruise control (lever 600 in neutral), spring 1015 causes the subassembly 1000 to move downwardly, so that the notch 1020 engages the pin 261 to engage the cruise control. When the cruise control is not selected by the control 800, the cable 1022 moves the subassembly 1000 away from the pin 261 against the bias provided by spring 1015. In this way, the tractor will not follow a prescribed course and the single hand lever control 600 will return to the neutral position when released.

FIGS. 13-16 show details of the single lever control 150. The control comprises a control lever 600 mounted, for example, by bolting, to a bracket 610. Bracket 610 is slidable vertically on an upstanding bracket 620 that is affixed to an inverted U shaped control bracket 630. Bracket 610 is moveable vertically in slotted holes 640 on pins 650 (FIG. 16) that are affixed to the bracket 610. A spring loaded presence switch 660 is provided having a plunger 670 biased downwardly by spring 662. The switch wires are shown at 664. In the position shown with the switch plunger 670 undepressed, the transmissions are in neutral. The engine can be started when the switch is in this position. When the control 600 is engaged by a user by pressing it downwardly, the plunger 670 is depressed, providing an indication that an operator is present. Should the operator release the control, preferably the engine will be stopped. The spring in the switch 660 is used to return the control lever 600 to the undepressed position. Alternatively, another or additional spring can be provided to accomplish this function.

Figure 13:
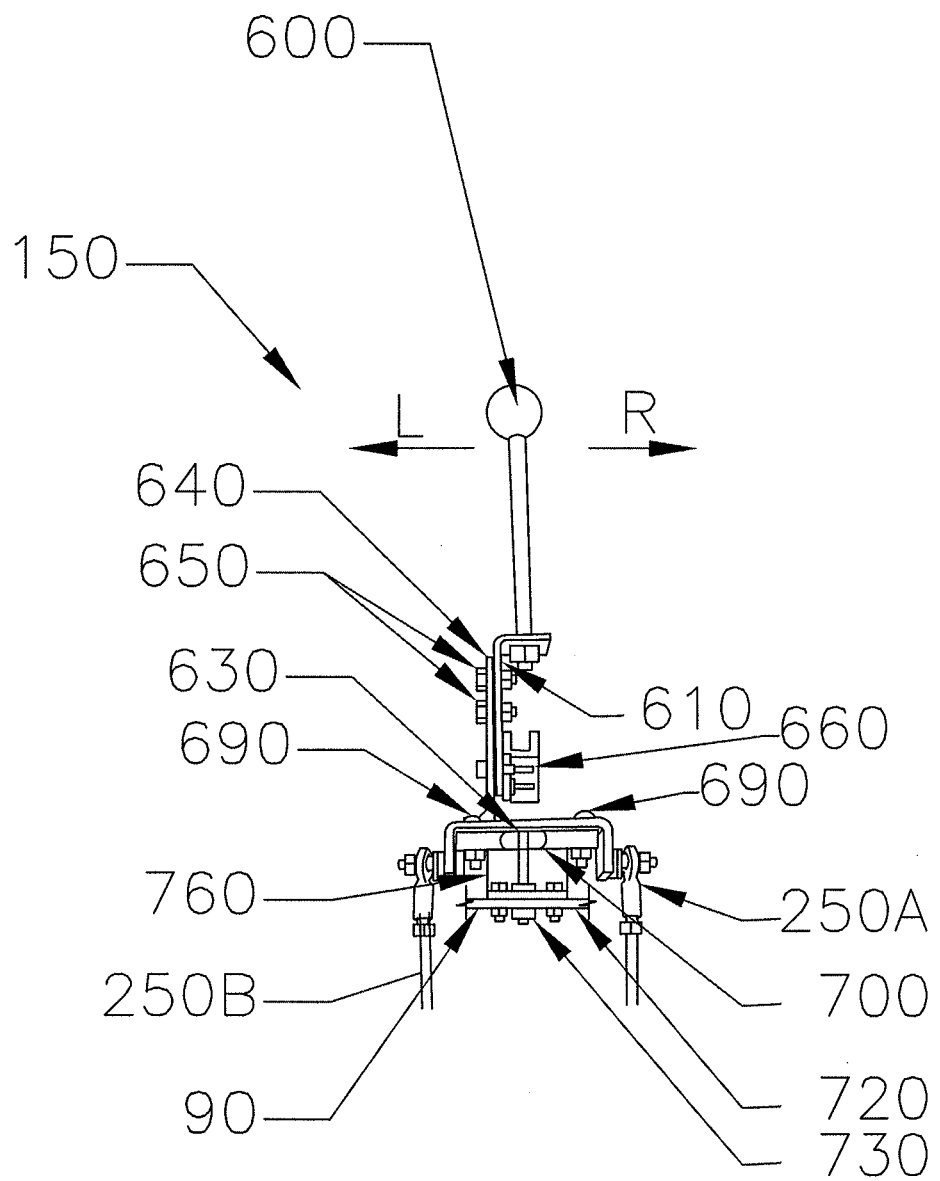
FIG. 13 shows a front view of the joystick single lever hand control.

Upstanding bracket 620 is mounted to the U shaped control bracket 630 to which is mounted on its underside a spherical ball flange bearing having spherical ball 700 in flange 680. The flange 680 of the bearing is mounted to the U shaped bracket by suitable bolts 690. There are spacers 750 fitted between the spherical ball flange 680 and the U shaped control bracket 630 to provide for clearance of the head 701 of the shoulder bolt 710. The spherical ball 700 of the bearing is free to rotate relative to the bearing flange 680. Spherical ball 700 is fastened to a mounting bracket 720 by bolt 710 which bracket 720 is in turn fastened to the control panel 90 of the tractor. The shoulder bolt 710 is affixed to bracket 720. A spacer 740 is installed between the spherical ball 700 and the mounting bracket 720 to provide proper clearance for the spherical ball 700 to rotate in the flange 680. In this way, the U shaped bracket 630 can rock fore and aft and left and right and axially in any quadrant between the axes, thereby controlling the control rods 250A and 250B. FIG. 13 shows the control mechanism 150 from the front of the tractor.

Accordingly, when the control lever 600 is moved in the forward direction, the rods 250A and 250B are pushed downwardly with the operation as described in connection with FIG. 12. When the control lever 600 is moved rearwardly, the rods 250A and 250B are pulled upwardly thereby controlling the transmissions to cause a reverse movement.

When the control lever 600 is moved to the right, corresponding to the movement in the direction "L" in FIG. 13, control rod 250B is moved downwardly and control rod 250A is moved upwardly thereby causing the right transmission to go into forward direction and the left transmission to go into reverse direction, thereby causing a left turn. When control lever 600 is moved to the left, corresponding to "R" in FIG. 13, rod 250A moves downwardly and rod 250B moves upwardly thereby placing the right transmission in the reverse direction and the left transmission in the forward direction causing a right turn.

Figure 14:
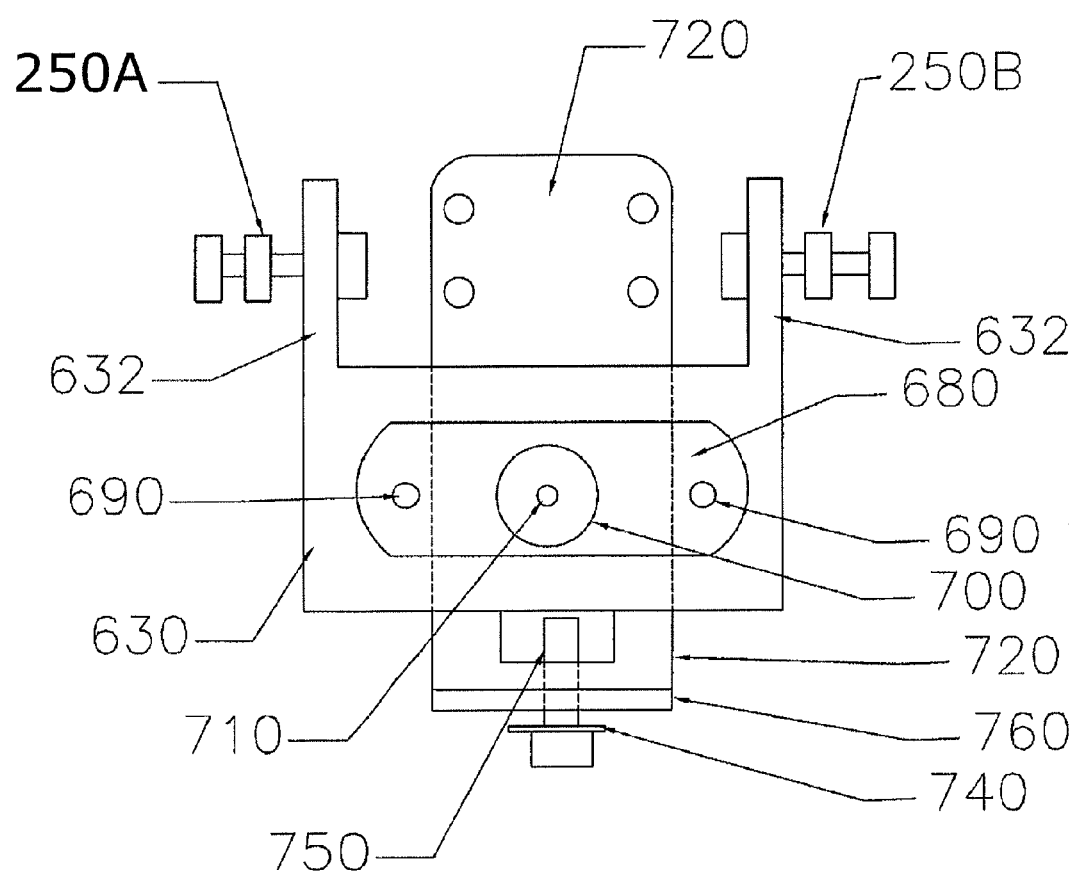
FIG. 14 shows a top view of the joystick single lever hand control.
Figure 15:
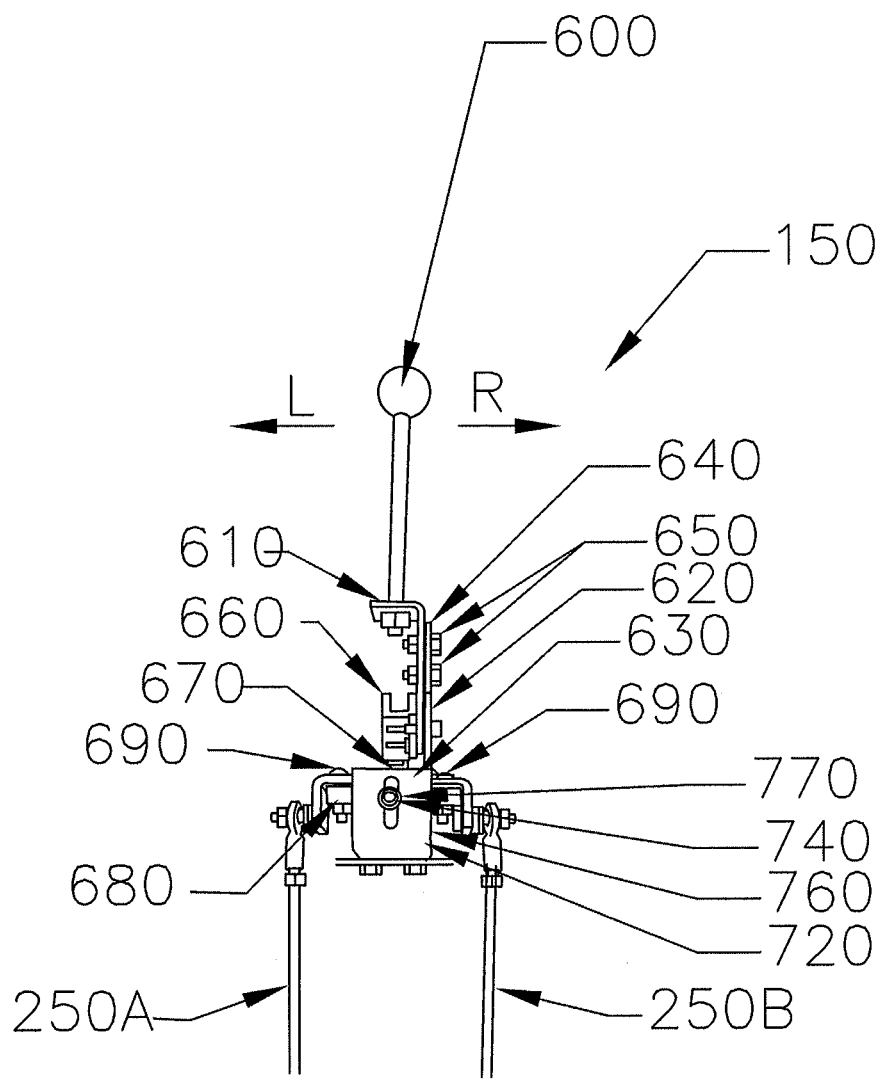
FIG. 15 shows a rear view of the joystick single lever hand control.

FIG. 14 shows the single lever control mechanism 150 from a top view with the rear of the tractor at the bottom of the figure. The control rods 250A and 250B are mounted on forwardly extending extensions 632 of U shaped bracket 630. Bracket 630 is able to move fore and aft and left and right and is prevented from moving rotationally by a pin 740 that is bolted to the bracket 630 via a tab 750 on bracket 630. An upturned projection 760 of the bracket 720 has an elongated slot 770 therein (see FIG. 15), which allows the pin 740 to move vertically thereby allowing the forward and aft and left and right rocking motions but preventing rotational movement of the U shaped bracket 630.

Figure 16:
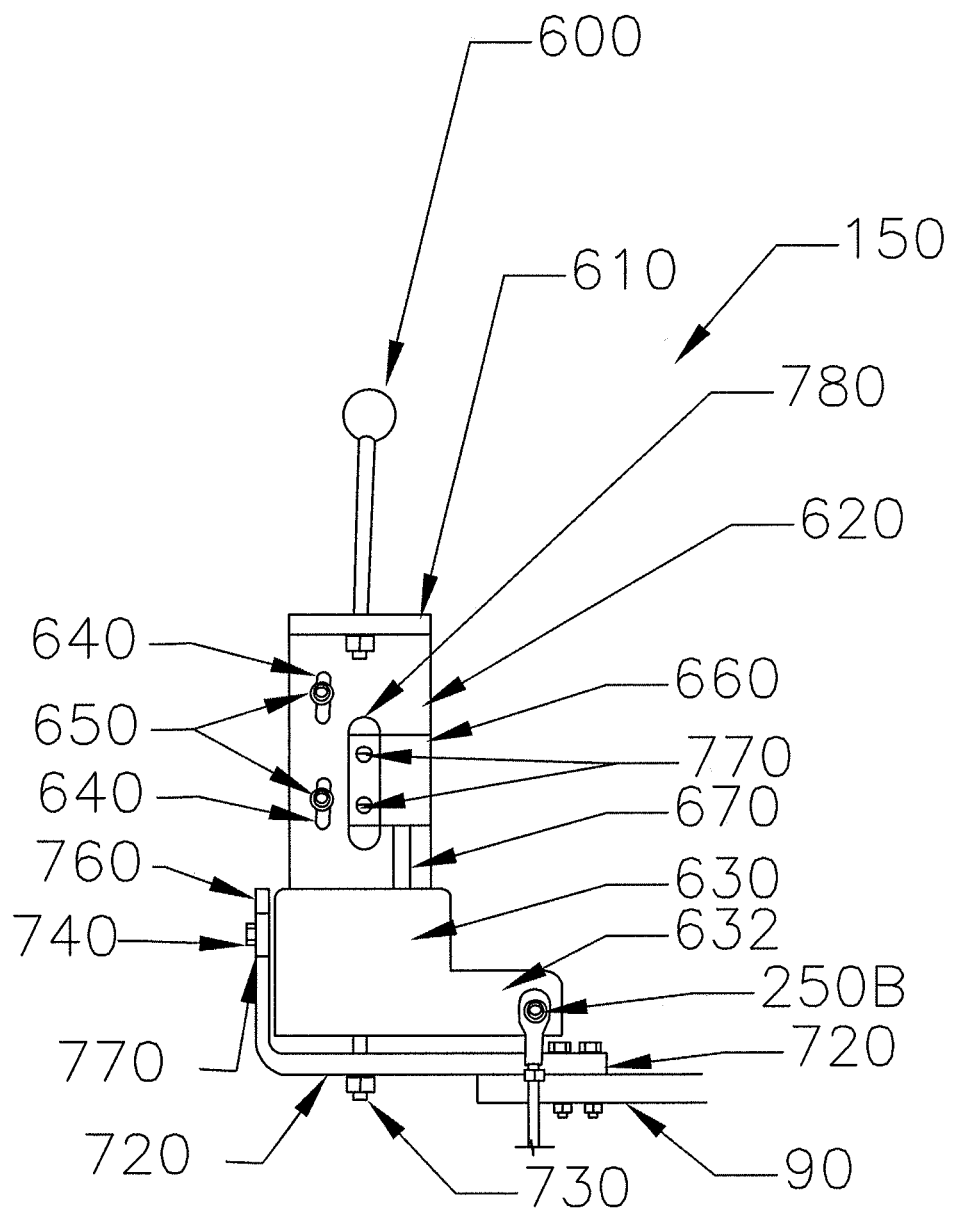
FIG. 16 shows a right side view of the single lever hand control.

FIG. 16 shows a right side view of the control mechanism 150. Switch 660 is mounted to the bracket 610 via screws 770. Clearance for and access to the screw heads 770 is provided by a slot 780 in the bracket 620.

Figure 17:
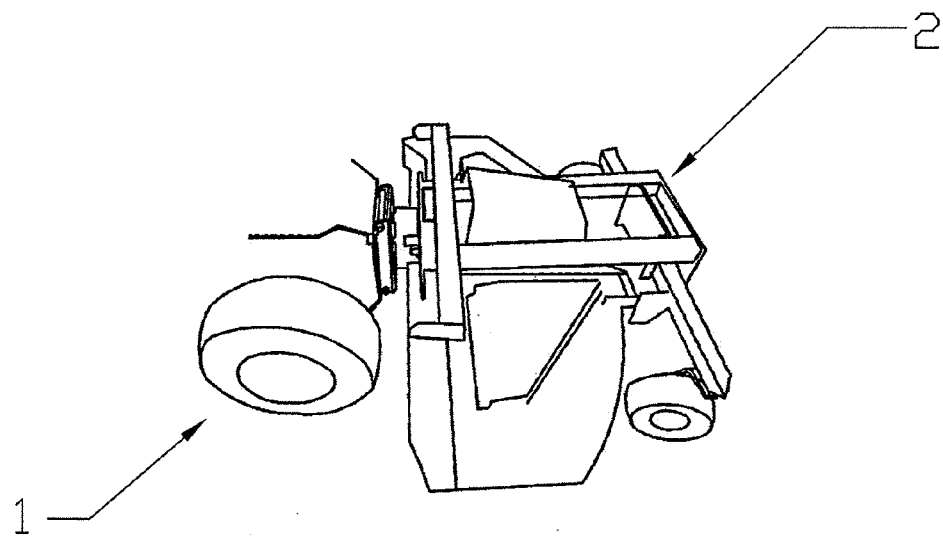
FIG. 17 shows an attachment, in particular, a lawnmower attachment, coupled to the PTO attachment adaptor of the tractor.
Figure 18:
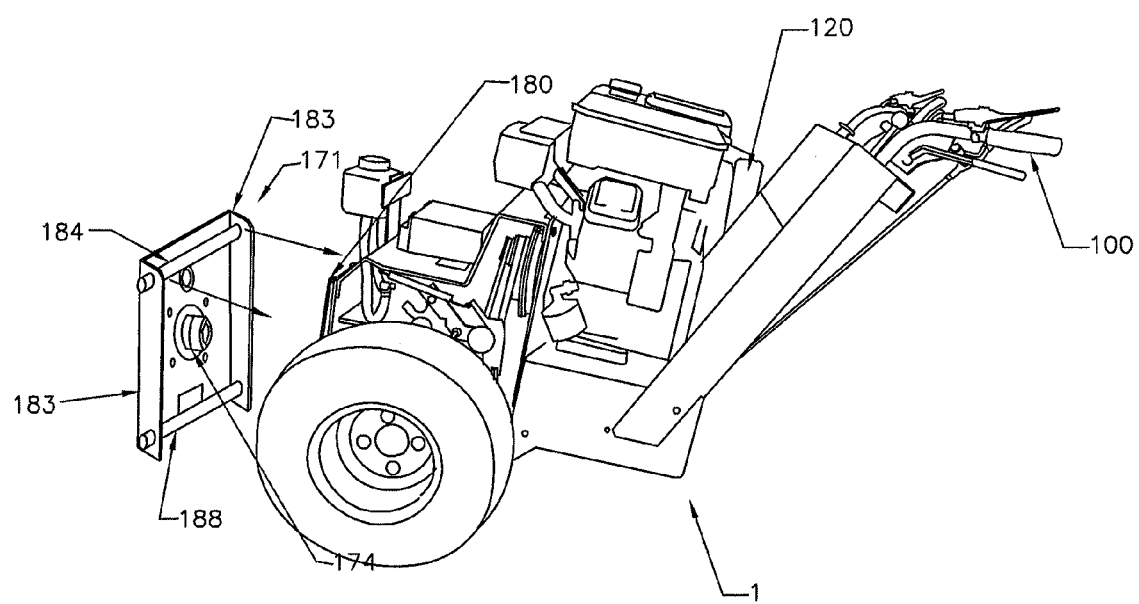
FIG. 18 shows how the tractor is tilted to allow the receiving plate of a powered attachment to be connected to the PTO attachment adapter.

FIG. 17 shows the tractor 1 coupled to an exemplary powered attachment 2 comprising a lawn mowing attachment. FIG. 18 shows how the operator manipulates the tractor to engage the powered attachment. The operator moves the handles upwardly, as shown, causing the front of the tractor to move downwardly. The operator causes the top hooks 182 of the rails 180 (FIG. 2B) to engage under the top pin 184 of the receiver plate 171 of the attachment. This is visible from the operator's position. Once the hooks 182 engage the pin 184, the operator moves handles 100 downwardly. The weight of the tractor 1 causes the rails 180 on the adapter plate 169 to engage the rails 183 on the receiver plate 169 of the attachment and force the rails 180 and 183 into alignment. This aligns the coupling 172 on the adapter plate 169 with the mating coupling 174 on the attachment receiver plate, which are then coupled for transmitting power to the attachment.

Figure 19:
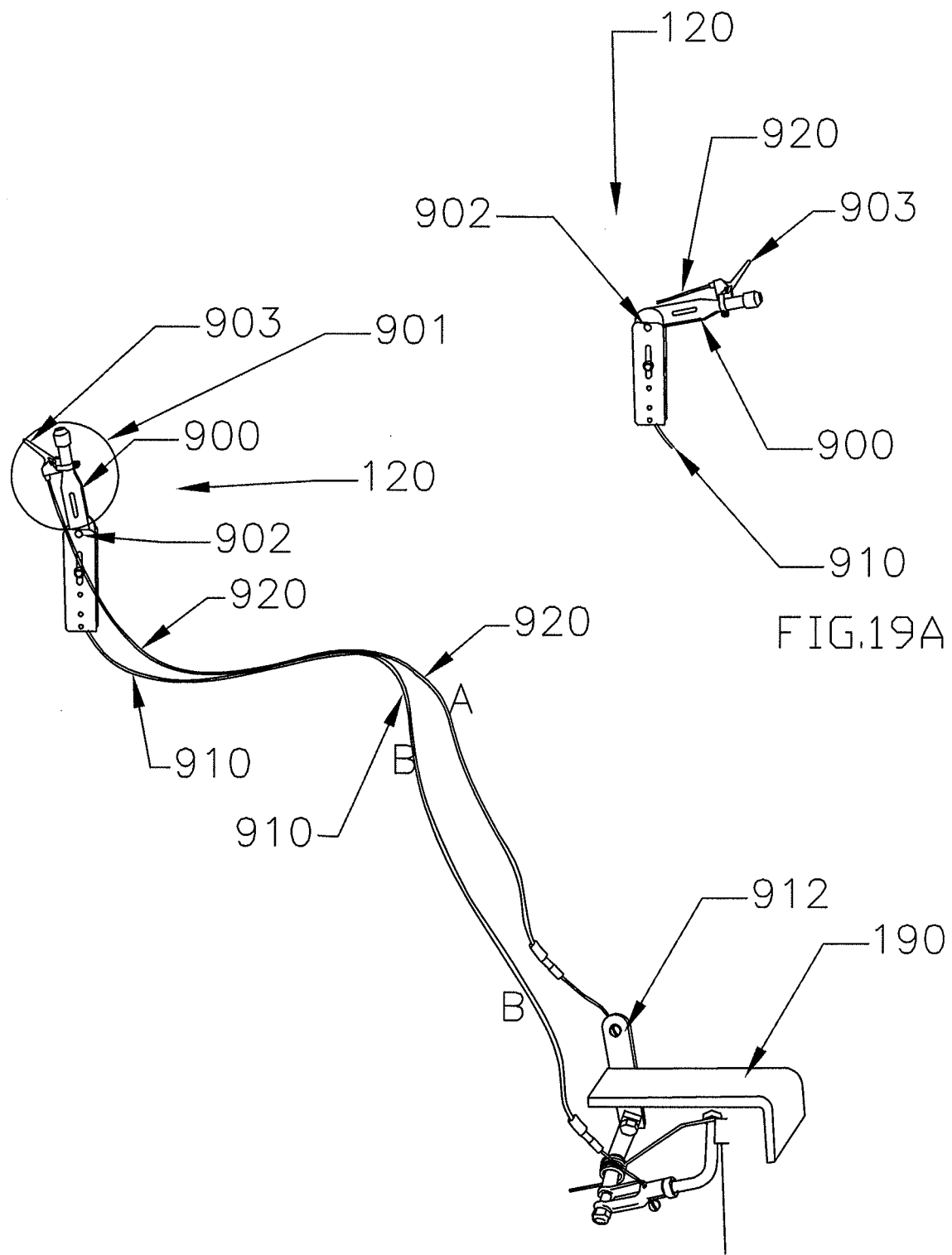
FIG. 19 shows the control linkage for engaging/disengaging the PTO attachment adapter and for locking the attachment in place.

The operator then operates the mechanism 120 (FIG. 19) to lock the hook 190 against the lower pin 188 of the receiver plate. In particular, mechanism 120 includes a pivotable handle 900 that rotates forwardly in direction 901 on pivot 902. FIG. 19A shows the mechanism pivoted into the released state. This movement operates cable 910 that moves hook 190 forward via lever 912. This allows the hook 190 to clear the pin 188 prior to locking it on the pin 188. A trigger lever 903 coupled to a cable 920 allows the hook 190 to be raised above the pin 188 when it is squeezed.

When the operator desires to lock the receiver plate 171 to the adapter plate 169, the operator releases the trigger lever 903 to drop the hook 190 down in front of the pin 188. Then, lever 900 is raised in the direction opposite arrow 901 (i.e., counterclockwise) to draw the hook rearwardly to lock the receiver plate 171 to attachment adapter plate 169 and cause coupling 172 and 174 to couple. The PTO clutch can then be engaged to power the attachment.

To release the attachment, the reverse procedure is employed. The lever 900 is pivoted forwardly in the direction of arrow 901. This moves the hook 190 forward away from pin 188. Then, while squeezing lever 903 to raise the hook 190, the handles 100 of the tractor are raised, tipping the front of the tractor downward. This will release the pin 188 from contact with adapter plate 169, separating the bottom of the attachment from the tractor and separating the power couplings 172 and 174. Then, the handles are tilted down a little more to separate upper pin 184 from the top hooks 182 of rails 180. The tractor is moved rearwardly to complete the separation of the attachment.

Figure 24:
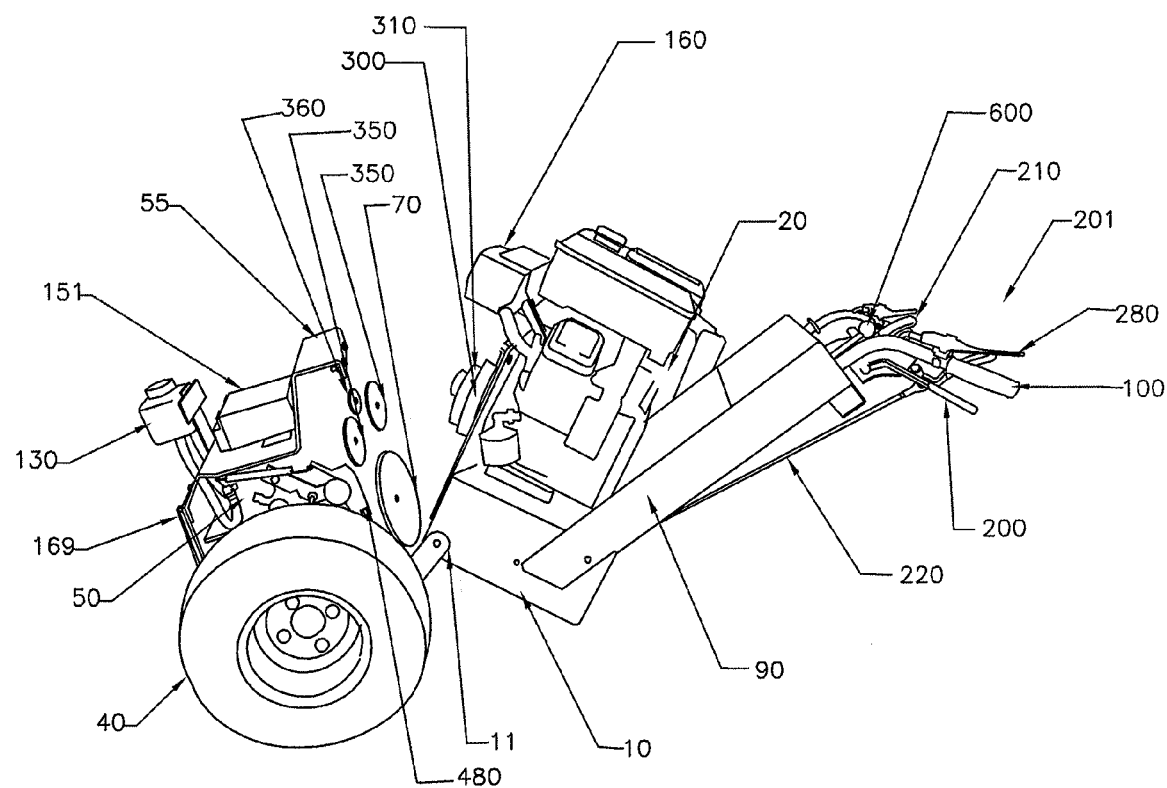
FIG. 24 shows how the power deck and front adapter housing are hinged to provide access to the belt drives.

FIG. 24 shows how access can be obtained to the belt drives to facilitate changing and servicing the belts and drive mechanisms.

First, with reference to FIG. 1, bolts 56 are undone. This decouples the top of the front adapter housing 55 from the top of the power deck 10. The power deck 10 and adapter housing 55 pivot as shown in FIG. 24 at hinge point 11. The belts 320 and 340 will flex between the pulleys on the engine and those mounted to the adapter housing 55, but can now easily be removed and changed.

The present invention describes a walk-behind tractor with front and rear power take-offs, a front mounted power attachment mechanism and a single hand drive control. These concepts can also be employed with other types of tractors including stand-up riding tractors, sit down tractors etc. Furthermore, the powered attachments need not be only moving attachments, such as snow blowers, brushes and lawn mowers, for example. The attachments could also be of the stationary type, such as pressure washers, air compressors, etc. In such case, it will be necessary to provide an interlock override such as a switch operated by the stationary attachment to override the presence controls provided on the hand controls (as there is no need to have an operator present at the controls if a stationary powered attachment is being used). In such a case, since the operator will not be standing behind the hand controls, the interlocks on these controls must be defeated in order to allow the stationary powered attachment to be used.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A tractor comprising:
 a base for supporting a motive power source, left and right driven wheels, and left and right transmissions for the respective left and right wheels;
 a fixed, non-rotatable handle structure coupled to the base for grasping by an operator from behind the tractor;
 a drive system for driving each of the left and right transmissions with motive power from the motive power source;
 further comprising a single lever hand control for operation by a single hand of the operator for controlling both left and right transmissions seamlessly each between reverse speed through neutral and forward speed to control the speed and direction, forward and reverse, and steering of the tractor, further wherein the handle structure comprises left and right handles, the left handle comprising a left transmission control and the right handle comprising a right transmission control; and whereby an operator can independently control the left and right transmissions using the left and right transmission controls using both left and right hands or alternatively can control the left and right transmissions using the single lever hand control.

2. A tractor comprising:

a base for supporting a motive power source, left and right driven wheels, and left and right transmissions for the respective left and right wheels;

a handle structure coupled to the base for grasping by an operator from behind the tractor;

a drive system for driving each of the left and right transmissions with motive power from the motive power source;

further comprising a single lever hand control for operation by a single hand of the operator for controlling both left and right transmissions seamlessly each between reverse speed through neutral and forward speed to control the speed and direction, forward and reverse, and steering of the tractor; and wherein the single lever hand control comprises:

a control lever for movement along two perpendicular axes and in any angular direction between the axes;

the two perpendicular axes comprising a first axis in forward and aft directions and a second axis in left and right directions;

a control bracket coupled to the lever;

the control bracket having left and right flanges;

control linkages coupled to the left and right flanges;

the control linkages coupled to respective speed regulator controls of the left and right transmissions thereby to allow control of both left and right transmissions using the control lever from reverse speed through neutral and into forward speed.

3. The tractor of claim 2, further comprising a structure attached to said control bracket that allows the control lever to rock about a pivot point along the first and second axes, further comprising an anti-rotation mechanism that prevents rotation in a horizontal plane about said pivot point.

4. The tractor of claim 3, wherein said structure comprises a spherical flanged bearing affixed to said control bracket and wherein the flanged bearing is disposed on a shaft fixedly coupled to said handle structure, thereby allowing the control bracket to pivot fore and aft and left and right.

5. The tractor of claim 4, wherein the anti-rotation mechanism comprises a pin fixed to said control bracket that moves in a vertical slot of a bracket fixed to said handle structure.

6. A tractor comprising:

a base for supporting a motive power source, left and right driven wheels, and left and right transmissions for the respective left and right wheels;

a handle structure coupled to the base for grasping by an operator from behind the tractor;

a drive system for driving each of the left and right transmissions with motive power from the motive power source;

further comprising a single lever hand control for operation by a single hand of the operator for controlling both left and right transmissions seamlessly each between reverse speed through neutral and forward speed to control the speed and direction, forward and reverse, and steering of the tractor;

further wherein:

the handle structure comprises left and right handles, the left handle comprising a left transmission control and the right handle comprising a right transmission control; and whereby an operator can independently control the left and right transmissions using the left and right transmission controls using both left and right hands or alternatively can control the left and right transmissions using the single lever hand control;

wherein the left and right transmissions are hydrostatic transmissions, further comprising a speed regulator control lever on each transmission that allows seamless control of the transmission from reverse speed through neutral into forward speed, further comprising a transmission control bracket movably coupled to the speed regulator control lever;

the speed regulator control lever having a coupling point coupled to a first control linkage coupled to a respective left or right transmission control and the transmission control bracket for each transmission having a respective second control linkage coupled to the single lever hand control, the transmission control bracket for each transmission allowing the single lever hand control to control the respective transmission seamlessly from reverse speed through neutral into forward speed, the speed regulator control lever and the transmission control bracket on each transmission engaging to allow either of the first control linkage and the second control linkage to control the respective transmission independently of each other seamlessly from reverse speed through neutral and into forward speed to control the speed and direction, forward and reverse, and steering of the tractor.

7. A tractor comprising:

a base for supporting a motive power source, left and right driven wheels, and left and right transmissions for the respective left and right wheels;

a handle structure coupled to the base for grasping by an operator from behind the tractor;

a drive system for driving each of the left and right transmissions with motive power from the motive power source;

further comprising a single lever hand control for operation by a single hand of the operator for controlling both left and right transmissions seamlessly each between reverse speed through neutral and forward speed to control the speed and direction, forward and reverse, and steering of the tractor;

further wherein:

the handle structure comprises left and right handles, the left handle comprising a left transmission control and the right handle comprising a right transmission control; and whereby an operator can independently control the left and right transmissions using the left and right transmission controls using both left and right hands or alternatively can control the left and right transmissions using the single lever hand control;

wherein the left and right transmissions are hydrostatic transmissions, further comprising a speed regulator control lever on each transmission that allows seamless control of the transmission from reverse speed through neutral into forward speed, further comprising a transmission control bracket movably coupled to the speed regulator control lever;

the speed regulator control lever having a coupling point coupled to a first control linkage coupled to a respective left or right transmission control and the transmission control bracket for each transmission having a respective second control linkage coupled to the single lever hand control, the transmission control bracket for each transmission allowing the single lever hand control to control the respective transmission seamlessly from reverse speed through neutral into forward speed; and wherein the transmission control bracket comprises a V-shaped bracket having a V-shaped track, a roller that rides along the track, the roller being rotatably coupled to the speed regulator control lever, the transmission control bracket being biased by an urging force against the roller, the first control linkage from the respective left or right transmission control controlling the transmission speed regulator control lever, so that the roller moves along the track of the V-shaped bracket when the respective left or right transmission control is used to control the transmission.

8. The tractor of claim 7, wherein the second control linkage is coupled to the V-shaped bracket to move the V shaped bracket and the roller biased against the V-shaped bracket as a unit to operate the transmission speed regulator control lever.

9. The tractor of claim 2, further comprising a cruise control device for holding a prescribed course set by the single lever hand control.

10. The tractor of claim 9, wherein the single lever hand control can be used to set the prescribed course for the tractor and wherein the left and right transmission controls can be used to override the prescribed course set by the single lever hand control.

11. The tractor of claim 9, wherein the cruise control device comprises a friction device.

12. A tractor comprising:
a base for supporting a motive power source, left and right driven wheels, and left and right transmissions for the respective left and right wheels;
a handle structure coupled to the base for grasping by an operator from behind the tractor;
a drive system for driving each of the left and right transmissions with motive power from the motive power source;
further comprising a single lever hand control for operation by a single hand of the operator for controlling both left and right transmissions seamlessly each between reverse speed through neutral and forward speed to control the speed and direction, forward and reverse, and steering of the tractor;
further wherein:
the handle structure comprises left and right handles, the left handle comprising a left transmission control and the right handle comprising a right transmission control;
whereby an operator can independently control the left and right transmissions using the left and right transmission controls using both left and right hands or alternatively can control the left and right transmissions using the single lever hand control;
further comprising a cruise control device for holding a prescribed course set by the single lever hand control; and
wherein the cruise control device comprises a friction device; and
wherein the friction device comprises first and second planar surfaces adapted for sliding frictional movement subject to a bias force that allows the planar surfaces to move with respect to each other when subjected to a force greater than the bias force but that maintains their relative position when the force is removed to maintain the single lever hand control in a fixed position to maintain the prescribed course.

13. The tractor of claim 12, further comprising a control to select and deselect the cruise control device.

14. The tractor of claim 12, wherein the planar surfaces comprise a movable plate and a fixed plate in sliding relation, the movable plate being biased against the fixed plate by at least one spring.

15. The tractor of claim 14, further comprising a washer element for providing a smooth sliding action of said movable and fixed plates.

16. The tractor of claim 15, wherein the washer element comprises nylon and is provided between the plates or between the at least one spring and one of the plates.

17. The tractor of claim 9, wherein the tractor returns to the prescribed course when the left and right transmission controls are returned to neutral positions.

18. The tractor of claim 1, further wherein there is a longitudinally disposed space between the left and right transmissions, further comprising a power take off shaft disposed in the space extending anteriorly and driven by the motive power source for powering a powered attachment arranged to be attached at the anterior of the tractor.

19. The tractor of claim 18, further comprising a power take off adapter disposed at an anterior location on said tractor having a power coupling driven by said power take off shaft, said adapter allowing a single operator to connect and disconnect a powered attachment by manipulating handles of the handle structure of the tractor from an operator's position.

20. The tractor of claim 19, wherein:
said power coupling is attached to the power take off shaft;
said power take off adapter comprises a front mounted adapter plate;
said power coupling extending out of an opening in said front mounted adapter plate;
said power coupling being adapted to engage a mating coupling on a receiver plate of a powered attachment;
further comprising an alignment structure on the adapter plate for causing said power coupling to align with the mating coupling of the powered attachment;
said alignment structure being arranged to allow the weight of the tractor to be used to cause the power coupling and mating coupling to align and engage;
further comprising a locking structure for locking said engaged power coupling and mating coupling together.

21. The tractor of claim 20, wherein said alignment structure comprises a set of rails facing anteriorly inclined toward each other on said adapter plate that engage with rails on the receiver plate for forcing said power coupling and mating coupling into alignment through manipulation of said tractor.

22. The tractor of claim 21, wherein the inclined rails have top edges inclined rearwardly forming a hook for engaging a horizontal top pin of the receiver plate and having bottom edges that are rounded to allow a horizontal bottom pin of the receiver plate to slide beneath the bottom edges;
further wherein the power coupling is slidable on a spline on the power take off shaft and spring loaded so as to be biased to engage the mating coupling.

23. The tractor of claim 22, wherein the locking structure comprises a hook that is movable forward and aft and vertically by the operator, thereby to allow the hook to be moved over the bottom horizontal pin of the receiver plate by the vertical motion of the hook and the receiver plate to be drawn against the adapter plate by the aft motion of the hook.

24. The tractor of claim 23, further comprising an operator control on the handle structure for controlling the forward and aft motion and vertical motion of the hook.

25. The tractor of claim 18, further comprising a power take off clutch coupled to an output shaft of said motive power source, said clutch being selectively engageable by a user to power said power take off shaft.

26. The tractor of claim 25, further comprising a belt drive coupling said clutch to a driven pulley provided on said power take off shaft.

27. The tractor of claim 26, further wherein said base comprises a power deck for the motive power source and an adapter housing for mounting said transmissions, said adapter housing being releasably coupled to said power deck to provide access to said belt drive.

28. The tractor of claim 27, further comprising a hinge coupling said adapter housing and power deck allowing the adapter housing to be pivoted away from the power deck to expose the belt drive.

29. The tractor of claim 26, further comprising a second belt drive for coupling the motive power source through said clutch to drive pulleys for hydraulic pumps of each of said transmissions.

30. A tractor comprising:
a base for supporting a motive power source, left and right driven wheels, and left and right transmissions for the respective left and right wheels;
a handle structure coupled to the base for grasping by an operator from behind the tractor;
a drive system for driving each of the left and right transmissions with motive power from the motive power source;
further comprising a single lever hand control for operation by a single hand of the operator for controlling both left and right transmissions seamlessly each between reverse speed through neutral and forward speed to control the speed and direction, forward and reverse, and steering of the tractor;
further wherein:
the handle structure comprises left and right handles, the left handle comprising a left transmission control and the right handle comprising a right transmission control; and
whereby an operator can independently control the left and right transmissions using the left and right transmission controls using both left and right hands or alternatively can control the left and right transmissions using the single lever hand control;
wherein the left and right transmissions are hydrostatic transmissions, further comprising a speed regulator control lever on each transmission that allows seamless control of the transmission from reverse speed through neutral into forward speed, further comprising a transmission control bracket movably coupled to the speed regulator control lever;
the speed regulator control lever having a coupling point coupled to a first control linkage coupled to a respective left or right transmission control and the transmission control bracket for each transmission having a respective second control linkage coupled to the single lever hand control, the transmission control bracket for each transmission allowing the single lever hand control to control the respective transmission seamlessly from reverse speed through neutral into forward speed; and
wherein the first control linkage for each transmission comprises a first control rod from the respective left or right transmission control, a first pivot shaft on which a first lever coupled to the first control rod is pivotally disposed, a first intermediate rod controlled by the movement of the first lever, the first intermediate rod controlling a second lever on a second pivot shaft, the second lever controlling a first further control rod pivotally coupled to said speed regulator control lever.

31. The tractor of claim 30, wherein the second control linkage for each transmission comprises a second control rod from the single lever hand control, a third lever pivotally mounted on the first pivot shaft, a second intermediate rod controlled by the movement of said third lever, the second intermediate rod controlling a fourth lever on the second pivot shaft, the fourth lever controlling a second further control rod fixedly attached to said transmission control bracket for moving said transmission control bracket to move said transmission speed regulator control lever.

32. The tractor of claim 8, wherein said V-shaped bracket is biased against said roller by a spring.

33. The tractor of claim 2, wherein the control bracket comprises an inverted U-shaped bracket, further comprising a spring urging said U-shaped bracket to a neutral position.

34. The tractor of claim 25, further comprising a spring loaded switch on said control lever connected into an electrical circuit requiring operator presence in order to engage the power take off clutch.

35. The tractor of claim 34, wherein said switch is connected into a circuit that prevents the motive power source from being started if the power take off clutch is engaged.

36. The tractor of claim 2, where the left and right transmission controls comprise a squeeze lever mounted on each handle of the handle structure for controlling transmission speed in a first direction and a thumb lever cooperating with the squeeze lever for controlling transmission speed in a second opposite direction.

37. The tractor of claim 26, further comprising a shaft coupled to said driven pulley extending posteriorly for driving a rear power take off for powering a rear mounted powered attachment.

38. The tractor of claim 1, wherein the tractor is a walk-behind tractor.

* * * * *